(12) United States Patent
Tsumura et al.

(10) Patent No.: US 7,376,289 B2
(45) Date of Patent: May 20, 2008

(54) IMAGE PROCESSING METHOD AND IMAGE PROCESSING APPARATUS

(75) Inventors: Keiichi Tsumura, Hyogo (JP); Taichi Nagata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 697 days.

(21) Appl. No.: 10/898,250

(22) Filed: Jul. 26, 2004

(65) Prior Publication Data

US 2005/0068327 A1    Mar. 31, 2005

(30) Foreign Application Priority Data

Sep. 30, 2003    (JP) .......................... P2003-341669

(51) Int. Cl.
*G06K 9/60*    (2006.01)
(52) U.S. Cl. .................... 382/305; 382/282; 382/289; 382/296; 358/409; 358/426.05; 358/453
(58) Field of Classification Search ................ 382/190, 382/282, 289, 296, 305; 358/409, 426.05, 358/453
See application file for complete search history.

(56) References Cited

U.S. PATENT DOCUMENTS

| | | | | |
|---|---|---|---|---|
| 5,128,765 A | * | 7/1992 | Dingwall et al. ............ | 348/729 |
| 5,212,599 A | * | 5/1993 | Sakai et al. .................. | 386/117 |
| 5,373,371 A | * | 12/1994 | Masui ......................... | 358/444 |
| 5,995,140 A | * | 11/1999 | Cooper et al. ............... | 348/159 |
| 6,049,636 A | * | 4/2000 | Yang .......................... | 382/289 |
| 6,271,935 B1 | * | 8/2001 | Cook .......................... | 358/1.9 |
| 6,272,247 B1 | * | 8/2001 | Manickam et al. ......... | 382/217 |
| 6,707,932 B1 | * | 3/2004 | Chakraborty ............... | 382/113 |
| 6,791,602 B1 | * | 9/2004 | Sasaki et al. ............... | 348/159 |
| 7,199,820 B2 | * | 4/2007 | Oka et al. ................. | 348/211.3 |
| 2002/0085009 A1 | | 7/2002 | Yamagata | |

FOREIGN PATENT DOCUMENTS

JP    2002-259208    9/2002

* cited by examiner

*Primary Examiner*—Yosef Kassa
(74) *Attorney, Agent, or Firm*—McDermott Will & Emery LLP

(57) ABSTRACT

Image data having a total number of pixels being H×V is written in SDRAM having an enough number of recording domains capable of storing all the pixel data of the image data and the number of Column addresses set therein at $2^n$ ($4 \leq n$) in the order of lines after the implementation of a first image rotation processing at a rotation angle of 90°×m ($0 \leq m \leq 3$) to the image data and read from the SDRAM in the order of the lines after the implementation of a second image rotation processing at a rotation angle of 90°×p ($0 \leq p \leq 3$). In doing so, the recording domains of the SDRAM are divided into a plurality of recording blocks $2_{1-s}$ having the number of the Column addresses set therein at $2^q$ ($2 \leq q \leq (n-2)$) and capable of storing groups of the pixels for one line in the image data after the implementation of the first image rotation processing. The groups of the pixels for one line in the image data in an image direction after the implementation of the first image rotation processing are written in the recording blocks $2_{1-s}$. The written image data is read from the SDRAM in an image direction after the implementation of the second image rotation processing.

16 Claims, 19 Drawing Sheets

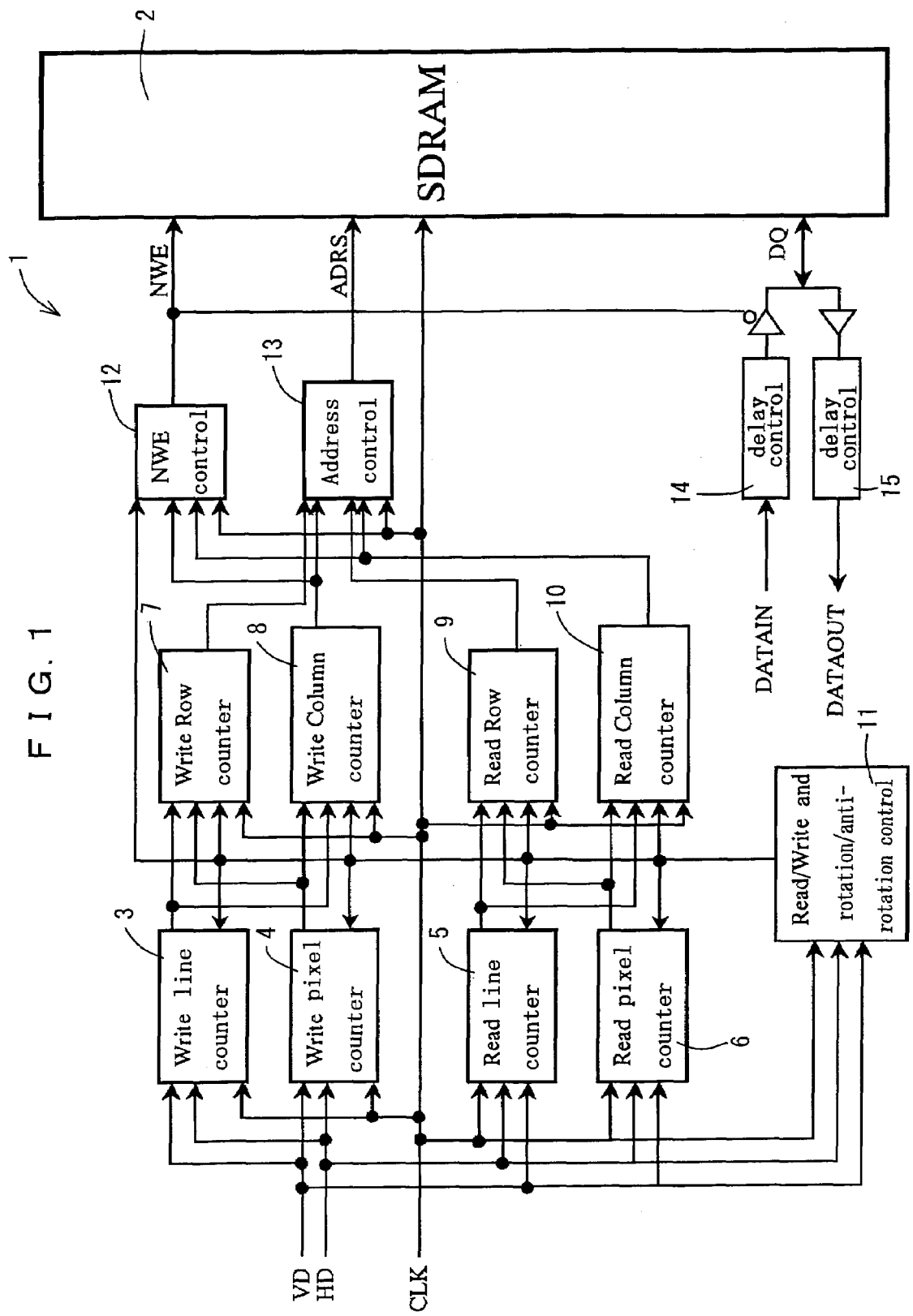
F I G. 1

F I G. 4
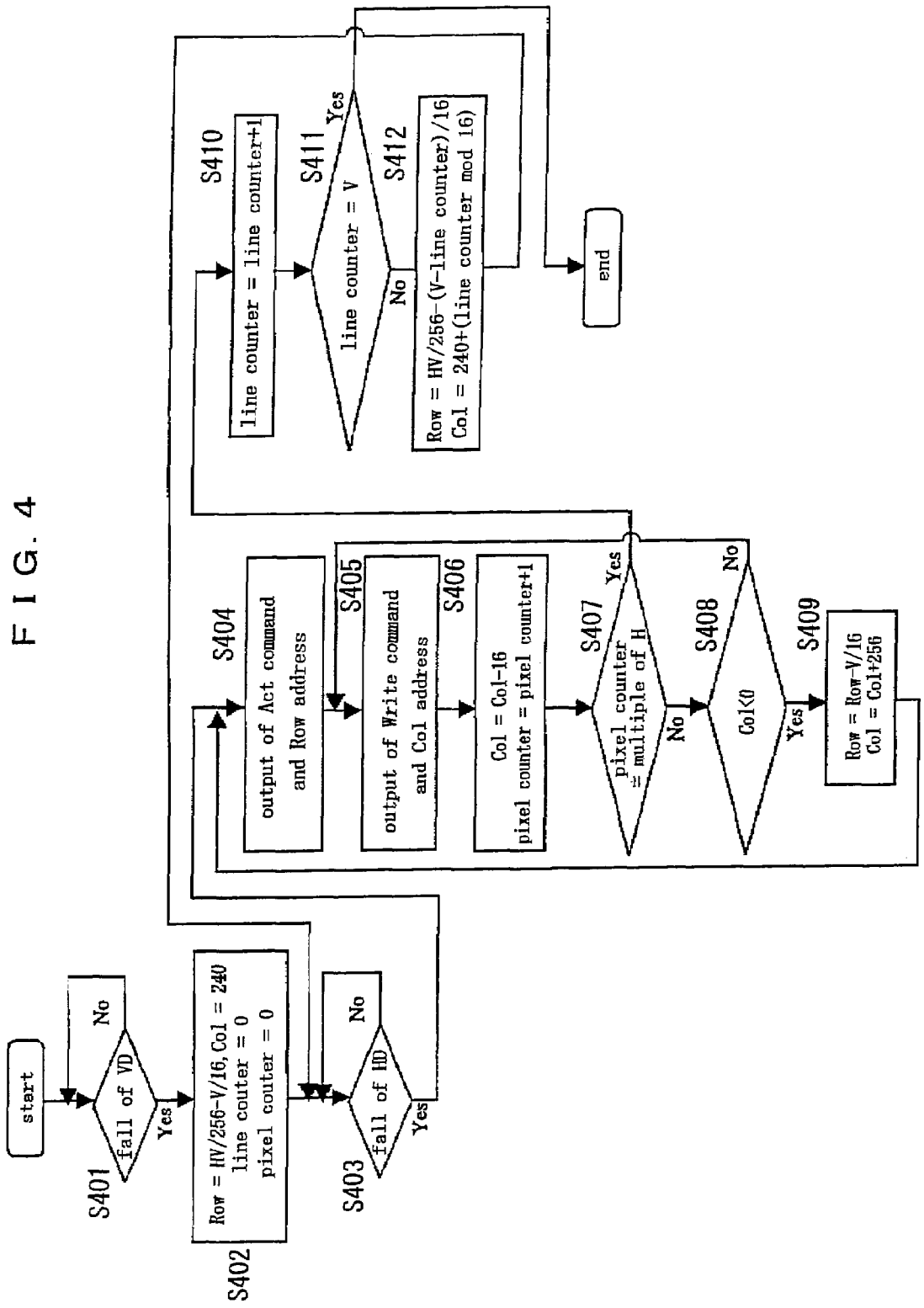

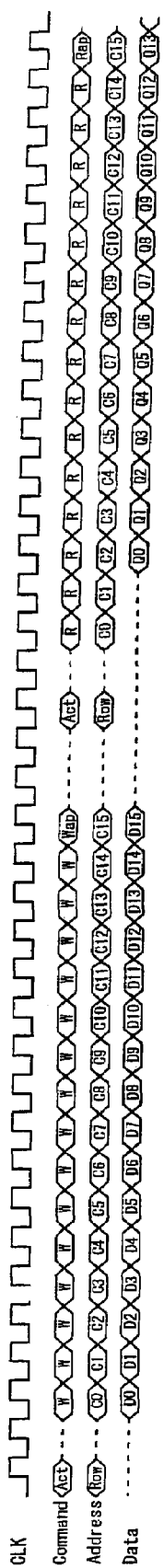

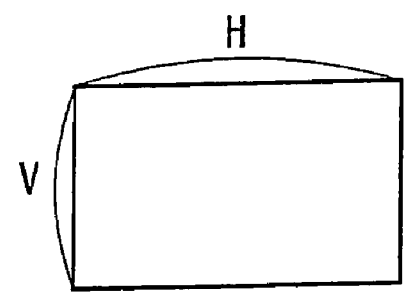
F I G. 1 9 A
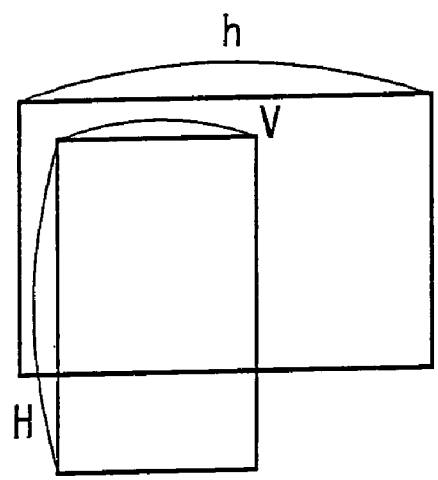
F I G. 1 9 B
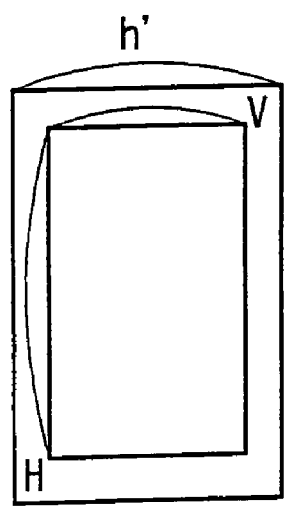
F I G. 1 9 C

IMAGE PROCESSING METHOD AND IMAGE PROCESSING APPARATUS

FIELD OF THE INVENTION

The present invention relates to an image processing method and image processing apparatus for appending a rotation processing to an image to be processed in writing and reading the image with respect to SDRAM (Synchronous Dynamic Random Access Memory).

BACKGROUND OF THE INVENTION

Conventionally, in the processing of writing and reading image data with respect to image domains in SDRAM, respective pixel data constituting the image data are sequentially written in each of the recoding domains in the SDRAM in the order of the pixel layout on the image data and read therefrom. In the SDRAM, the image data is sequentially stored in each of the recording domains designated by Row and Column addresses and read therefrom.

In the SDRAM, burst read, which is a processing aimed for time reduction in data transfer, is generally implemented. The processing is implemented based on that a plurality of the recording domains in memory devices, including the SDRAM, shares a Row address. More specifically, when a plurality of the recording domains sharing the common Row address are designated, the common address is first designated, and the Column addresses are then sequentially designated to thereby designate the respective recording domains. In this manner, the Row address is commonly designated in the plural recording domains, which serves to reduce time required for transferring the image data.

In some cases, the writing/reading processing of the image with respect to the SDRAM additively includes rotation of the image data. When the rotation is implemented, as disclosed in No. 2002-259208 of the publication of unexamined patent applications, the image rotation processing is implemented mainly when reading the image data from the SDRAM.

In the conventional image processing apparatuses, however, the image rotation processing leads the burst read processing to be implemented with more difficulty and leads the processing to require more time. This problem is described below.

The implementation of the image rotation processing at an optional angle requires a great deal of time. In contrast to that, when the image rotation processing is implemented at 90° pitch (90°×s (s: integer, $1 \leq s \leq 3$)), the processing can be implemented by means of backward read of the addresses or horizontally and vertically backward layout of the image, either of which requires a relatively short time. For the reason, the image rotation processing is usually implemented at 90° pitch.

The horizontally and vertically backward layout of the image is implemented by misreading the Column addresses as the Row addresses. In such address misreading, the Row address is to be changed per pixel data when the image data is read.

The burst read can only be implemented when the common Row address is shared in writing and reading the image data with respect to the SDRAM. The burst read is, therefore, infeasible in the conventional image rotation processing which requires the change of the Row address per pixel data when the image data is read. This inevitably lengthens the processing time.

SUMMARY OF THE INVENTION

Therefore, a main object of the present invention is to reduce time required for an image rotation processing.

In order to achieve the foregoing object, the present invention, to an image processing method and image processing apparatus, wherein, image data having the total number of pixels being H×V (H: the number of pixels for one line, V: the total number of lines, H and V: integer) is written in SDRAM having an enough number of recording domains capable of storing all the pixels of the image data and the number of Column addresses set therein at $2^n$ ($4 \leq n$, n: integer) in the order of the lines after a first image rotation processing at the rotation angle of 90°×m ($0 \leq m \leq 3$, m: integer) is implemented to the image data, and the written image data is read from the SDRAM in the order of the lines after a second image rotation processing at the rotation angle of 90°×p ($0 \leq p \leq 3$, p: integer) is further implemented to the image data, exercises the following measures:

First, the recording domains of the SDRAM are divided into a plurality of recording blocks having the number of the Column addresses set at $2^q$ ($2 \leq q \leq (n-2)$, q: integer) and an enough number of recording regions capable of storing groups of pixels for one line in the image data in an image direction resulting from the implementation of the first image rotation processing to the image data.

Next, the respective groups of pixels for one line in the image data in the image direction resulting from the implementation of the first image rotation processing to the image data are arranged to sequentially correspond to the respective recording blocks in the order of the lines.

Then, the respective groups of pixels for one line in the image data in the image direction resulting from the implementation of the first image rotation processing to the image data are written in the respectively corresponding recording blocks based on an addressing for incrementing the Row addresses per the number of the Column addresses of the recording blocks.

Finally, the image data written in the SDRAM is read from the SDRAM in the order of the lines in the image direction resulting from the implementation of the second image rotation processing to the image data.

Also, according to the present invention, in the image processing method and apparatus, wherein the image data having the total number of the pixels being H×V (H: the number of the pixels for one line, V: the total number of the lines, H and V: integer) is written in the SDRAM having the number of the recording domains capable of storing all the pixels of the image data and the number of the Column addresses set therein at $2^n$ ($4 \leq n$, n: integer) in the order of the lines in the image direction of the image data, and the written image data is read from the SDRAM in the order of the lines after the image rotation processing at the rotation angle of 90°×p ($0 \leq p \leq 3$, p: integer) is implemented to the image data, the recording domains of the SDRAM are divided into a plurality of the recording blocks having the number of the Column addresses set at $2^q$ ($2 \leq q \leq (n-2)$, q: integer) and the number of the recording regions capable of storing the groups of pixels for one line in the image data in an image direction prior to the implementation of the implementation of the image rotation processing.

Next, the respective groups of the pixels for one line in the image data in the image direction prior to the implementation of the image rotation processing are arranged to sequentially correspond to the respective recording blocks in the order of the lines in the same image direction.

Then, the respective groups of the pixels for one line in the image data in the image direction prior to the implementation of the image rotation processing are written in the respectively corresponding recording blocks in the order of the lines based on the addressing for incrementing the Row addresses per the number of the Column addresses of the recording blocks.

Finally, the image data written in the SDRAM is read from the SDRAM in the order of the lines in the image direction resulting from the implementation of the image rotation processing.

Further, according to the present invention, in the image processing method and apparatus, wherein, the image data having the total number of the pixels being H×V (H: the number of the pixels for one line, V: the total number of the lines, H and V: integer) is written in the SDRAM having the number of the recording domains capable of storing all the pixels of the image data and the number of the Column addresses set therein at $2^n$ ($4 \leq n$, n: integer) in the order of the lines after the image rotation processing at the rotation angle of $90° \times m$ ($0 \leq m \leq 3$, m: integer) is implemented to the image data, and the written image data is read from the SDRAM in the order of the lines in the image direction of the image data after the implementation of the image rotation processing thereto, the recording domains of the SDRAM are divided into a plurality of the recording blocks having the number of the Column addresses set at $2^q$ ($2 \leq q \leq (n-2)$, q: integer) and the number of the recording regions capable of storing the groups of the pixels for one line in the image direction of the image data after the implementation of the image rotation processing thereto.

Next, the respective groups of the pixels for one line in the image direction of the image data after the implementation of the image rotation processing thereto are arranged to sequentially correspond to the respective recording blocks in the foregoing direction of the image data.

Then, the respective groups of pixels for one line in the image direction of the image data after the implementation of the image rotation processing thereto are written in the respective recording blocks in the order of the lines based on the addressing for incrementing the Row addresses per the number of the Column addresses of the recording blocks.

Finally, the image data written in the SDRAM is read from the SDRAM in the order of the lines in the image data in the image direction resulting from the implementation of the image rotation processing.

In this manner, according to the present invention, the Row addresses of a plurality of the pixels adjacent to one another in the writing/reading order can be standardized when the image data is written and read with respect to the SDRAM.

The present invention offers the following preferable examples.

When the rotation angle of the first image rotation processing is $90° \times r$ (r=1, 3), a horizontal synchronization period HD1 used when the image data is written in the SDRAM is set according to the following formula 1:

$$HD1 = VD/HD2 \qquad 1$$

VD: vertical synchronization period used in writing/reading the image data with respect to SDRAM HD2: horizontal synchronization period used in writing the image data prior to the implementation of the first image rotation processing thereto in SDRAM in the image direction of the image data.

When the rotation angle of the second image rotation processing is $90° \times r$ (r=1, 3), a horizontal synchronization period HD3 used when the image data is read from the SDRAM is set according to the following formula 2:

$$HD3 = VD/HD4 \qquad 2$$

VD: vertical synchronization period used in writing/reading the image data with respect to SDRAM HD4: horizontal synchronization period used in reading the image data prior to the implementation of the second image rotation processing thereto from SDRAM in the image direction of the image data.

Thus, all the pixels constituting the image data can be reliably written and read within the vertical synchronization period VD used in writing and reading the image data with respect to the SDRAM.

As described, according to the present invention, the Row addresses of a plurality of the pixels adjacent to one another in the writing/reading order can be standardized when the image data is written and read with respect to the SDRAM, thereby achieving a faster processing speed.

BRIEF DESCRIPTION OF THE DRAWINGS

These and other objects as well as advantages of the invention will become clear by the following description of preferred embodiments and explicit in the appended claims of the invention. Many other benefits of the invention uncited in this specification will come to the attention of those skilled in the art upon implementing the present invention.

FIG. 1 is a functional block diagram illustrating the configuration of an image processing apparatus according to a preferred embodiment of the present invention.

FIG. 4 is a flow chart illustrating a second example of image data writing with respect to SDRAM according to the preferred embodiment of the present invention.

FIG. 18 is a timing chart when image data is read from SDRAM using the image processing apparatus according to the preferred embodiment of the present invention.

FIGS. 19A-19C are charts illustrating a relationship between the configuration of recording domains in SDRAM and the configuration of the layout of pixel data constituting image data written and read with respect to the SDRAM.

DETAILED DESCRIPTION OF THE INVENTION

Figure 2:
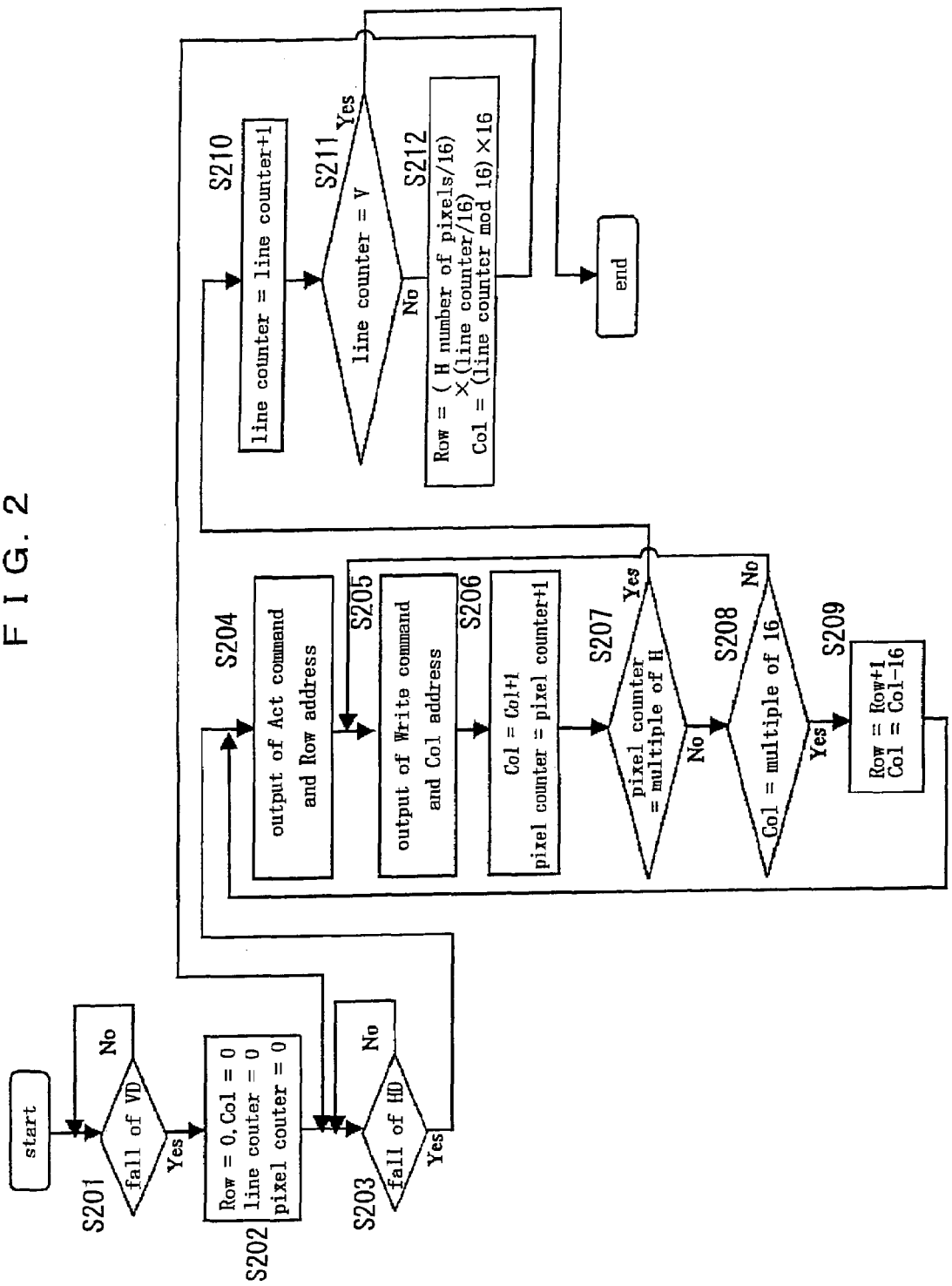
FIG. 2 is a flow chart illustrating a first example of image data writing with respect to SDRAM according to the preferred embodiment of the present invention.

FIG. 1 is a functional block diagram illustrating the configuration of an image processing apparatus 1 according to a preferred embodiment of the present invention. The image processing apparatus 1, which comprises SDRAM 2, controls the operations of writing and reading with respect to SDRAM 2 based on a vertical synchronization period (signal) VD, horizontal synchronization period (signal) HD and clock signal CLK, which are supplied to the image processing apparatus 1 from outside.

The image processing apparatus 1 comprises a Write line counter 3, Write pixel counter 4, Read line counter 5, Read pixel counter 6, Write Row counter 7, Write Column counter 8, Read Row counter 9, Read Column counter 10, Read/Write and rotation/anti-rotation controlling device 11, NWE controlling device 12, address controlling device 13, input delay controlling device 14 and output delay controlling device 15.

The Write line counter 3 calculates the number of lines in pixel data when image data is written based on the vertical synchronization period VD, horizontal synchronization period HD and clock signal CLK. The Write pixel counter 4 calculates the number of the pixel data when the image is written (in other words, the total number of the pixels already written at that time) based on the vertical synchronization period VD, horizontal synchronization period HD and clock signal CLK. The Read line counter 5 calculates the number of the lines in the image data when the image data is read (in other words, the total number of the lines already written at that time) based on the vertical synchronization period VD, horizontal synchronization period HD and clock signal CLK. The Read pixel counter 6 calculates the number of the pixels when the image data is read (in other words, the total number of the pixels already read at that time) based on the vertical synchronization period VD, horizontal synchronization period HD and clock signal CLK.

The Write Row counter 7 calculates the number of Write Row addresses when the image data is written in the SDRAM 2 based on the calculation results output by the Write line counter 3 and Write pixel counter 4, and clock signal CLK. The Write Row counter 7 calculates the number of the Write Row addresses based on a control by the Read/Write and rotation/anti-rotation controlling device 11.

The Write Column counter 8 calculates the number of Write Column addresses when the image data is written in the SDRAM 2 based on the calculation results output by the Write line counter 3 and Write pixel counter 4, and clock signal CLK. The Write Column counter 8 calculates the number of the Write Column addresses based on the control by the Read/Write and rotation/anti-rotation controlling device 11.

The Read Row counter 9 calculates the number of Read Row addresses when the image data is read from the SDRAM 2 based on the calculation results output by the Read line counter 5 and Read pixel counter 6, and clock signal CLK. The Read Row counter 9 calculates the number of the Read Row addresses when the image data is read from the SDRAM 2 based on the control by the Read/Write and rotation/anti-rotation controlling device 11.

The Read Column counter 10 calculates the number of Read Column addresses when the image data is read from the SDRAM 2 based on the calculation results output by the Read line counter 5 and Read pixel counter 6, and clock signal CLK. The Read Column counter 10 calculates the number of the Read Column addresses when the image data is read from the SDRAM 2 based on the control by the Read/Write and rotation/anti-rotation controlling device 11.

The NWE controlling device 12 supplies the SDRAM 2 with a NWE control signal by means of the control by the Read/Write and rotation/anti-rotation controlling device 11 based on the calculation results output by the Write Column counter 8 and Read Column counter 10, and clock signal CLK.

The address controlling device 13 generates address information when the image data is written and read based on the calculation results output by the Write Row counter 7, Write Column counter 8, Read Row counter 9 and Read Column counter 10, and clock signal CLK and supplies the SDRAM 2 with the address information.

The input delay controlling device 14 implements a delay control with respect to the image data written in the SDRAM 2. The input delay controlling device 15 also implements the delay control with respect to the image data read from the SDRAM 2.

The image processing apparatus 1 comprises steps of writing the pixel data in the SDRAM 2 by means of the Write line counter 3, Write pixel counter 4, Write Row counter 7, Write Column counter 8, address controlling device 13, NWE controlling device 12, and Read/Write and rotation/anti-rotation controlling device 11. The image processing apparatus 1 also comprises steps of reading the pixel data in the SDRAM 2 by means of the Read line counter 5, Read pixel counter 6, Read Row counter 9, Read Column counter 10, address controlling device 13, NWE controlling device 12, and Read/Write and rotation/anti-rotation controlling device 11.

Figure 6:
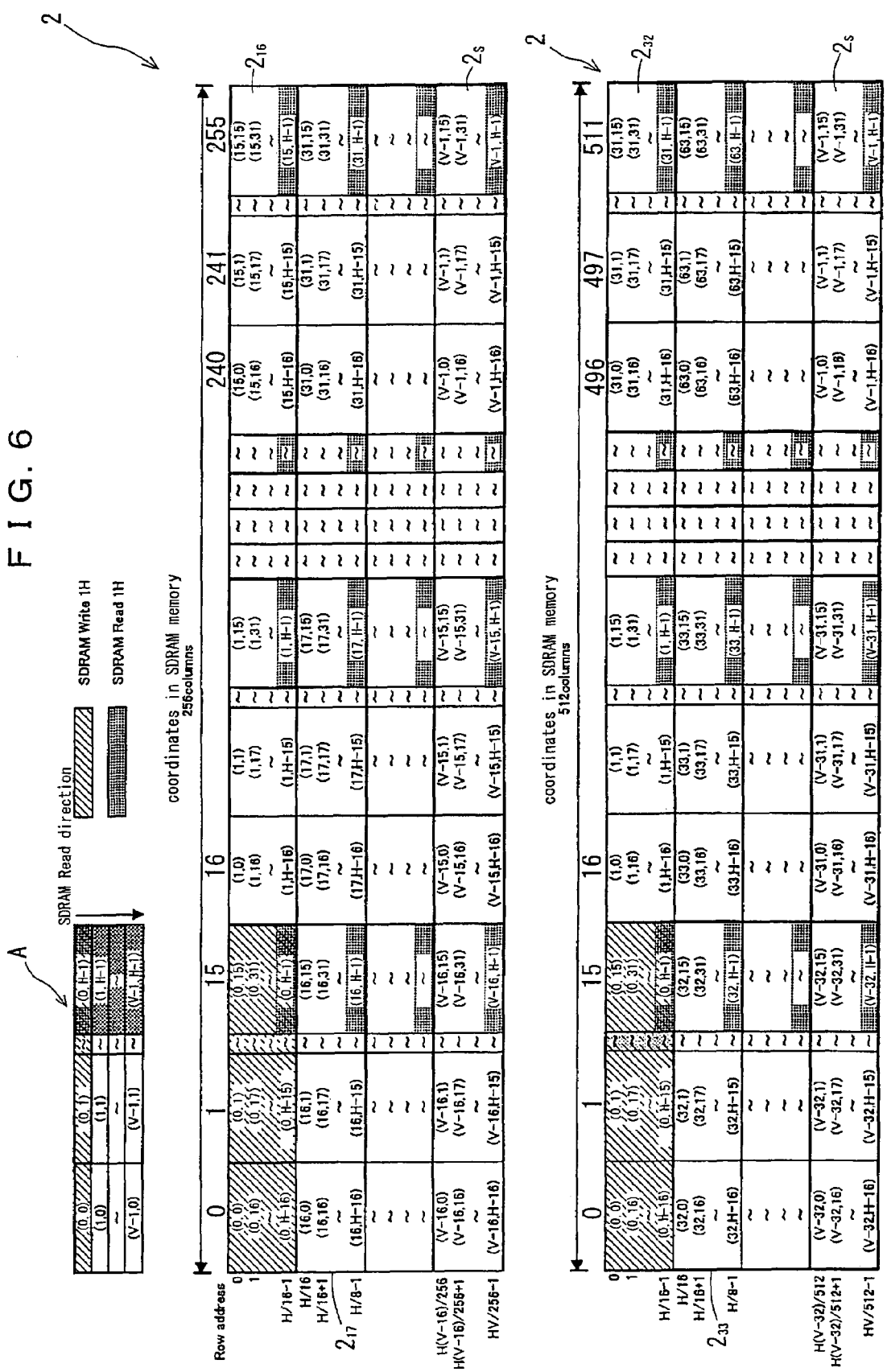
FIG. 6 is a chart illustrating a first example of pixel data layout in SDRAM according to the preferred embodiment of the present invention.
Figure 7:
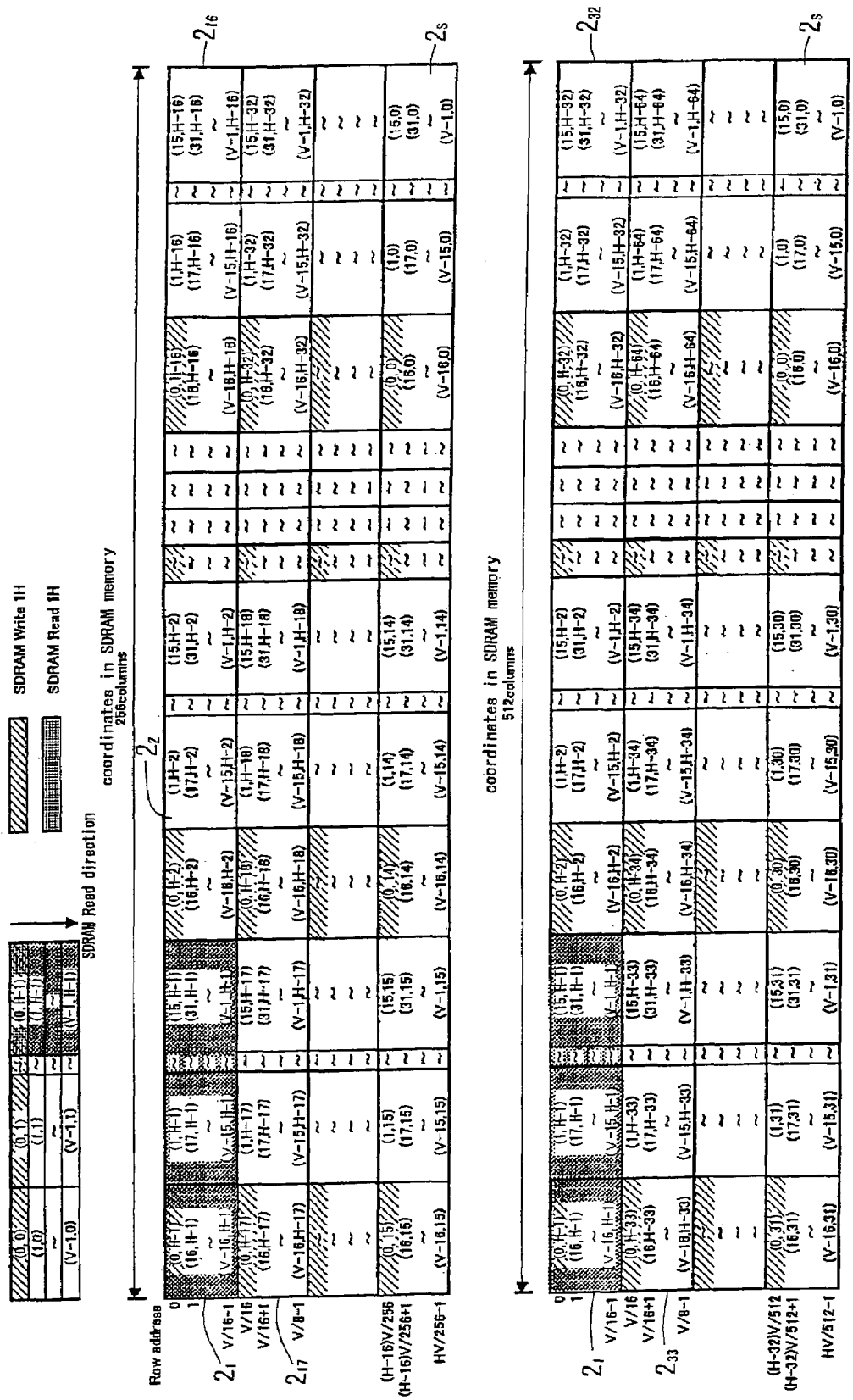
FIG. 7 is a chart illustrating a second example of pixel data layout in SDRAM according to the preferred embodiment of the present invention.

Hereinafter, an image rotation processing by means of the image processing apparatus 1 is described referring to FIGS. 2-16. Here is described the operation of the image rotation processing by means of the image processing apparatus 1 according to the following terms. In the SDRAM 2, the number of the Column addresses is $2^n$ ($4 \leq n$, n: integer), the number of the Row addresses is X (X: integer), and the total number of recording domains is ($2^n \times X$). FIGS. 6 and 7 illustrating the recording domains of the SDRAM 2 according to this embodiment exemplify two cases, in which, respectively n=8, and n=9, and the number of the Column addresses is, $2^8$=256, or $2^9$=512.

The image data subject to recording processing in the SDRAM 2 is loaded by an image-taking sensor such as CCD and has the total number of the pixels therein being H×V (H: the number of the pixels for one line, V: the total number of the lines, H and V: integer). The examples of image data layout are shown in FIGS. 6 and 7 with a reference symbol A appended thereto. In these drawings, x and y denote coordinates of the pixels in the image data. x and y respectively denote the vertical coordinate and the horizontal coordinate in the image data direction of the image data. In the image data having the number of the pixels of H×V according to this embodiment, x is in the range of (0-V−1), and y is in the range of (0-H−1). The image data accordingly has the pixel data of (0, 0)-(V−1, H−1). Further, the respective pixels of the image data represented by the foregoing coordinates are sequentially disposed in the respective address positions in the SDRAM 2 shown in FIGS. 6 and 7.

The total number of the recording domains in the SDRAM 2 is ($2^n \times X$)≧(H×V), which is capable of storing the total number of the pixels (H×V) of the image data.

The number of the pixels H for one line in the image data is an integral multiple of the number of the Column addresses in the SDRAM 2 (256 or 512 according to this embodiment).

H=number of Column addresses in SDRAM 2×Y (Y: integer)

It is possible that the number of the pixels H for one line in the image data is not equal to an integral multiple of the number of the Column addresses in the SDRAM 2. The present invention is still feasible by loading none of the remaining image domains for the image data, which does not lead to an integral multiple, into the SDRAM 2.

The image is written in the SDRAM 2 having the foregoing number of the recording domains and read therefrom. When the writing processing is implemented, the image data is written in the SDRAM 2 in the order of the lines after a first image rotation processing at the rotation angle of 90°×m (0≦m≦3, m: integer) is implemented to the image data. The image data written in the SDRAM is read therefrom in the order of the lines after a second image rotation processing at the rotation angle of 90°×p (0≦p≦3, p: integer) is implemented to the image data after the implementation of the first image rotation processing thereto.

As a result, the image processing apparatus 1, after consecutively implementing the first and second image rotation processing to the image data, outputs the image data after the implementation of the image rotation processing thereto from the SDRAM 2.

The main aspects of the first and second image rotation processing by means of the SDRAM 2 are as follows.

First, the recording domains of the SDRAM 2 are divided into a plurality of recording blocks $2_{1-s}$. Groups of the pixels for one line in the image direction resulting from the implementation of the first image rotation processing are arranged to sequentially correspond to the respective recording blocks $2_{1-s}$ in the order of the lines. The number of recording regions in the recording blocks $2_{1-s}$ is set at a number capable of storing the groups of pixels for one line in the image data in the image direction of the image data after the implementation of the first image rotation processing thereto. In this embodiment, the number of the recording regions in the recording blocks $2_{1-s}$ is set at a number identical to the number of the groups of pixels for one line in the image data in the image direction resulting from the implementation of the first image rotation processing to the image data.

The respective groups of pixels for one line in the image direction of the image data after the implementation of the first image rotation processing thereto are written in the corresponding recording blocks $2_{1-s}$ based on an addressing for incrementing the Row addresses per the number of the Column addresses of the recording blocks $2_{1-s}$.

The image data written in the SDRAM 2 is read therefrom in the order of the lines in the image data in the image direction resulting from the implementation of the second image rotation processing.

In the respective recording blocks $2_{1-s}$ provided in the SDRAM 2, the number of the Columns disposed in a Row address (hereinafter, referred to as the number of Column addresses) is set at $2^q$ (2≦q≦(n−2), q: integer). The number of the recording regions in the recording blocks $2_{1-s}$ is set at a number capable of storing the groups of pixels for one line in the image data in the image direction of the image data after the implementation of the first image rotation processing thereto.

The variable n used for designating the number of the Column addresses for the recording blocks $2_{1-s}$ is the variable n used for designating the number of the Column addresses for the SDRAM 2. In this embodiment wherein n=8 and n=9, the variable q used for designating the number of the Column addresses for the recording blocks $2_{1-s}$ is within the ranges of 2≦q≦(8−2=6) and 2≦q≦(9−2=7). Therefore, the number of the Column addresses is within the ranges of $2^{2 \leq q \leq 6}$ and $2^{2 \leq q \leq 7}$. The present invention is feasible when the number of the Column addresses for the recording blocks $2_{1-s}$ is set within the foregoing ranges. In this embodiment, the number of the Column addresses for the recording blocks $2_{1-s}$ is ($2^{q=4}$)=16. The number of the Row addresses for the recording blocks $2_{1-s}$ is calculated according to the following formula:★★★★

$$\frac{\text{the number of the pixels for one line in the image direction of the first-image-rotation-processed image data}}{16}$$

In the SDRAM 2 having the number of the Column addresses being 256 or 512 according to this embodiment, the recording blocks $2_{1-s}$ are disposed in parallel, in the numbers of 256/16=16 or 512/16=32, in the Column-address direction.

Based on the described configuration of the recording blocks $2_{1-s}$, the recording blocks $2_{1-s}$ according to FIGS. 6 and 7 showing the recording domains of the SDRAM 2, have the following range of addresses.

The recording block $2_1$, the Column and Row addresses of which are in the initial locations of the addresses, have the following address ranges. In the configuration shown in FIG. 6, in which the rotation angle of the first image rotation processing is 0°, the recording block $2_1$ is within the ranges of 0-15 for Column address and O-H/16−1 for Row address. In the configuration shown in FIG. 7, in which the rotation angle of the first image rotation processing is 90°, the recording block $2_1$ is within the ranges of 0-15 for Column address and 0-V/16−1 for Row address.

The recording block $2_s$, the Column and Row addresses of which are in the final locations of the addresses, have the following address ranges. First is described a case of the number of the Column addresses being 256.

In the configuration shown in FIG. 6, in which the rotation angle of the first image rotation processing is 0°, the recording block $2_s$ is within the ranges of 240-255 for Column address and (H(V−16)/256-HV/256−1) for Row address. In the configuration shown in FIG. 7, in which the rotation angle of the first image rotation processing is 90°, the recording block $2_s$ is within the ranges of 240-255 for Column address and ((H−16)V/256-HV/256−1) for Row address.

Next is described the case, wherein the number of the Column addresses is 512. In the configuration shown in FIG. 6, in which the rotation angle of the first image rotation processing is 0, the recording block $2_s$ is within the ranges of 496-511 for Column address and (H(V−32)/512-HV/512−1) for Row address. In the configuration shown in FIG. 7, in which the rotation angle of the first image rotation processing is 90°, the recording block $2_s$ is within the ranges of 496-511 for Column address and ((H−32)V/512-HV/512−1) for Row address. The ranges of the addresses for the recording blocks $2_{1-s}$ are set as described because the number of the recording regions of the recording blocks $2_{1-s}$ is set at a number capable of storing the pixel data for one line in the image data in the image direction resulting from the implementation of the first image rotation processing.

When the rotation angles of the respective image rotation processing are 0° and 180°, the direction of the lines (Column-address direction) in the image direction after the implementation of the image rotation processing is equal to the direction of the lines in the image direction prior to the implementation of the implementation of the image rotation processing. When the rotation angles of the image rotation processing are 90° and 270°, the direction of the lines (Column-address direction) in the image direction after the implementation of the image rotation processing is not equal to the direction of the lines (Column-address direction) in the image direction prior to the implementation of the image rotation processing but equal to the Row-address direction prior to the implementation of the image rotation processing.

As described, the number of the pixel data stored in the recording blocks $2_{1-s}$ varies depending on the different combination patterns of the first and second image rotation processing. Therefore, the number of the groups of data-storing recording regions in the recording blocks $2_{1-s}$ varies depending on the different combination patterns of the first and second image rotation processing. Accordingly, the total number of the recording blocks $2_{1-s}$ set in the SDRAM 2 varies. The variable s representing the total number of the recording blocks $2_{1-s}$ varies depending on the varying total number of the recording blocks $2_{1-s}$, however is consistently used in this embodiment for convenience.

Hereinafter, the image rotation processing by means of the image processing apparatus 1 are described in detail. In the image processing apparatus 1, the image data is supplied to the SDRAM 2 from an image-taking sensor or the like in the order of the lines in an initial image direction at the time of the image taking. The pixel data constituting the respective lines is supplied to the SDRAM 2 in the direction parallel to the lines (in the order of the Column addresses). The respective groups of the pixel data constituting the image data are sequentially supplied to the SDRAM 2 in synchronization with the horizontal synchronization period HD.

Figure 3:
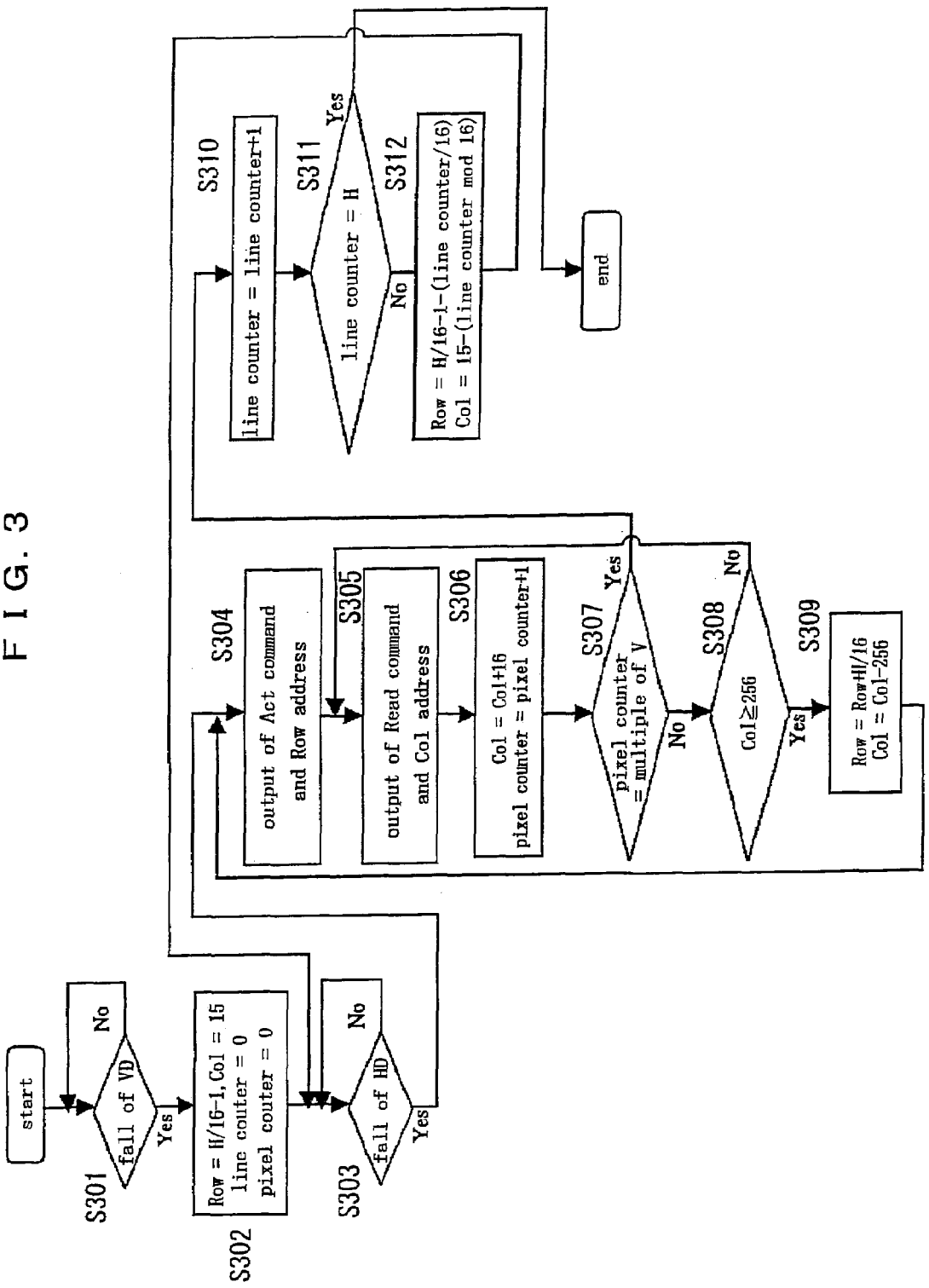
FIG. 3 is a flow chart illustrating a first example of image data reading with respect to SDRAM according to the preferred embodiment of the present invention.

Here is described the case in which the rotation angle of the first image rotation processing implemented when the image data is written in the SDRAM 2 is 0°, and the case in which the rotation angle of the second image rotation processing implemented when the image data is read from the SDRAM 2 is 90° referring to the flow charts of FIGS. 2 and 3 and the chart of FIG. 6 illustrating the image data layout in the SDRAM 2. The first image rotation processing at the rotation angle of 0° means that the first image rotation processing is not at all implemented.

First, the writing processing of the image data with respect to the SDRAM 2 (including the first image rotation processing at the rotation angle of 0°) is described referring to the flow chart of FIG. 2 and the chart of image data layout of FIG. 6.

When the writing processing with respect to the SDRAM 2 is commenced, the Read/Write and rotation/anti-rotation controlling device 11 monitors whether or not a fall timing of the vertical synchronization period VD arrives (S201). The Read/Write and rotation/anti-rotation controlling device 11, when detecting in the S201 that the fall timing of the vertical synchronization period VD arrives, initializes the respective count numbers of the Write Row counter 7, Write Column counter 8, Write line counter 3, and Write pixel counter 4 to "0" (S202).

Thereby, the Read/Write and rotation/anti-rotation controlling device 11 designates the recording block $2_1$ arranged first in the arrangement order of the recording blocks $2_1$-$2_s$ in choosing the first recording region in which the image data is written and also designates an initial recording region in the recording block $2_1$ as the write-in recording region.

The Read/Write and rotation/anti-rotation controlling device 11, after the initialization of the count numbers in the S202, monitors whether or not the fall timing of the horizontal synchronization period HD arrives (S203).

The Read/Write and rotation/anti-rotation controlling device 11, when detecting in the S203 that the fall timing of the horizontal synchronization period HD arrives, outputs an Act command to the SDRAM 2 and the Write Row addresses to the SDRAM 2 from the Write Row Counter 7 via the address controlling device 13 (S204).

At the timing immediately after the fall of the vertical synchronization period VD, the address controlling 13 outputs "0" as the Write Row address to the SDRAM 2. The SDRAM 2, after receiving the Act command and Write Row address "0", activates the groups of recording regions in the Row address "0" so as to be ready for writing processing.

At the timing immediately after the fall of the vertical synchronization period VD, the Read/Write and rotation/anti-rotation controlling device 11 consecutively outputs the Write command to the SDRAM 2 and outputs the Write Column addresses to the SDRAM 2 from the Write Column counter 8 via the address controlling device 13 (S205).

At the timing immediately after the fall of the vertical synchronization period VD, the address controlling 13 outputs "0" as the Write Column address to the SDRAM 2. The SDRAM 2, after receiving the Write command and Write Column address "0", writes the pixel data (x, y) of the image data input to the SDRAM 2 at the timing of the horizontal synchronization period HD in the recording region at the address position designated by the Write Row address and Write Column address in the S204 and S205.

When the writing processing in the S205 is completed, the Read/Write and rotation/anti-rotation controlling device 11 increases the count numbers of the Write Column counter 8 and Write pixel counter 4 by one (S206). The Read/Write and rotation/anti-rotation controlling device 11, after increasing the count numbers, judges whether or not the count number of the Write pixel counter 4 is equal to a multiple of the number of the pixels H in one line in initial image data prior to the implementation of the first image rotation processing thereto (S207).

When the count number of the Write pixel counter 4 is not equal to a multiple of the number of the pixels H in one line in the initial image data prior to the implementation of the first image rotation processing thereto in the S207, the Read/Write and rotation/anti-rotation controlling device 11 judges that the writing of the pixel data for one line in the initial image data is not completed yet. The Read/Write and rotation/anti-rotation controlling device 11, in the wake of making the judgment, judges whether or not the count number of the Write Column counter 8, which is increased in the S206, is equal to a multiple of the number of the Column addresses in the recording blocks $2_{1-s}$ (16 in this embodiment) (S208).

The Read/Write and rotation/anti-rotation controlling device 11, when judging that the count number of the Write Column counter 8 is not equal to a multiple of the number of the Column addresses in the recording blocks $2_{1-s}$ (16 in this embodiment), makes a judgment as follows.

The recording blocks $2_{1-s}$ are configured in the manner that groups of the recording regions disposed in parallel as wide as the Column addresses (16 in this embodiment) in the Column-address direction of the respective recording blocks (hereinafter, referred to as groups of the parallel-disposed recording regions) are arranged in plural number in the Row-address direction. The number of the groups of parallel-disposed recording regions is regulated based on the number of the pixel data for one line in the initial image data prior to the implementation of the first image rotation processing thereto as follows.

$$\text{number of parallel-disposed recording regions} = \frac{\text{number of pixels } H \text{ for one line in initial image data prior to the implemetation of first image rotation processing}}{\text{number of Column addresses in parallel-disposed recording regions}}$$

The Read/Write and rotation/anti-rotation controlling device 11, when judging that the count number of the Write Column counter 8 is not equal to a multiple of the number of the Column addresses in the recording blocks $2_{1-s}$ (16 in this embodiment) in the S208, judges that the writing of the pixel data is not completed yet in all the recording regions constituting the groups of the parallel-disposed recording regions in which the writing is being processed.

Figure 17:
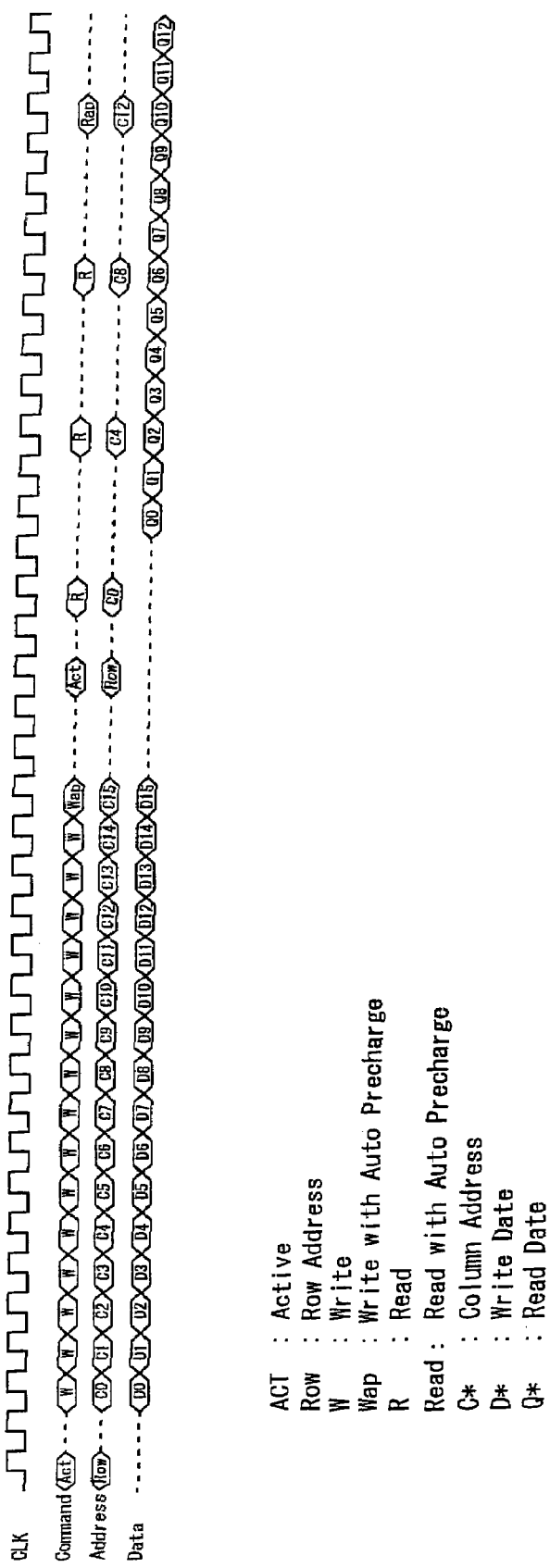
FIG. 17 is a timing chart when image data is written in SDRAM using the image processing apparatus according to the preferred embodiment of the present invention.

The Read/Write and rotation/anti-rotation controlling device 11, in the wake of the foregoing judgment in the S208, returns to the S205 to thereby write the pixel data in the remaining recording regions in which the pixel data is not stored yet in the groups of parallel-disposed recording regions in which the writing is being processed. In this case, the remaining recording regions and the next write-in recording region share a common Row address, which eliminates the need to designate the Row addresses (S204) at this point. The elimination of the Row address designation (S204) serves to reduce time required for writing the image data. The common Row address can be shared in the groups of the parallel-disposed recording regions of the recording blocks $2_{1-s}$. To share the common Row address at the time of writing the data is shown in the timing chart of FIG. 17 illustrating the writing processing. Here, the number of the recording regions of the groups of the parallel-disposed recording regions in the recording blocks $2_{1-s}$ is set at 16, therefore the pixel data is written at consecutive 16 times with one designated Row address.

In consequence of repeating the S205-S208, the Read/Write and rotation/anti-rotation controlling device 11, when judging that the count number of the Write Column counter 8 is equal to a multiple of the number of the Column addresses in the recording blocks $2_{1-s}$ (16 in this embodiment) in the S208, judges the completion of the writing of the pixel data with respect to all the recording regions constituting the groups of parallel-disposed regions, in which the pixel data is being written, and thereby moves on to the processing of S209.

In the S209, the Write Row addresses of the Write Row counter 7 are increased by one count, and the Write Column addresses of the Write Column counter 8 are decreased by 16. By doing so, the groups of the parallel-disposed recording regions for the writing processing are increased by one, and the column addresses for the writing processing are shifted to initial positions in the increased groups of parallel-disposed recording regions.

Going back to the S204 after the processing of the S209 is implemented, the S204-209 are repeated. The pixel data is thereby written in the groups of the parallel-disposed recording regions of the recording blocks $2_{1-s}$.

While the pixel data is written in the groups of parallel-disposed recording regions of the recording blocks $2_{1-s}$ (S204-S209), the Read/Write and rotation/anti-rotation controlling device 11 monitors whether or not the count number of the Write pixel counter 4 is equal to a multiple of the number of the pixels H for one line in the initial image data in the S207.

When it is judged that the count number of the Write pixel counter 4 is equal to a multiple of the number of the pixels (H) for one line in the initial image data, the Read/Write and rotation/anti-rotation controlling device 11 judges the completion of the writing processing of all the pixel data for one line in the initial image data with respect to the SDRAM 2. At that point, the number of the recording regions of the recording blocks $2_{1-s}$ is set at the number of the pixel data H for one line in the image data after the implementation of the first image rotation processing thereto (0° in this embodiment). All the recording regions of the recording blocks $2_{1-s}$, in which the writing is being processed, thereby store the pixel data.

When it is judged that all of the pixel data for one line in the initial image data prior to the implementation of the first image rotation processing thereto is successfully written in the recording blocks $2_{1-s}$ corresponding to each of the lines in the image data, the Read/Write and rotation/anti-rotation controlling device 11 implements the processing of S210.

In the S210, the number of the lines in the initial image data, which is counted by the Write line counter 3, is increased by one. After the processing of the S210 is implemented, the Read/Write and rotation/anti-rotation controlling device 11 judges whether or not the increased number of the lines of the Write line counter 3 is equal to the number of the lines in the image data prior to the implementation of the first image rotation processing thereto (the number of the lines V in the initial image data) (S211).

In the S211, when it is judged that the increased number of the lines of the Write line counter 3 is not equal to the number of the lines V in the initial image data prior to the implementation of the first image rotation processing thereto, the Read/Write and rotation/anti-rotation controlling device 11 judges that the reading processing of all the pixel data in the initial image data with respect to the SDRAM 2 is not completed yet.

The Read/Write and rotation/anti-rotation controlling device 11, when judging in the S211 that the reading processing of all the pixel data in the initial image data with respect to the SDRAM 2 is not completed yet, calculates the Write Row address and Write Column address according to the following formulas:

Write Row address=$(H/16)\times$(count number of Write line counter 3/16

(round down fractional part)

Write Column address=(count number of Write line counter $3_{mod}16)\times16$

The following address change is implemented according to the foregoing formulas. When the recording blocks $2_{1\text{-}s\text{-}1}$, with respect to which the writing processing of the pixel data is completed, are not disposed at the end in the Column-address direction, the address shift is as follows.

The Write Row addresses are decreased by 16 counts, while the Write Column addresses are increased by one count. The Write Row addresses and Write Column addresses are thereby to initial address positions of the next recording blocks $2_{1\text{-}s}$ adjacent to the writing-completed recording blocks $2_{1\text{-}s\text{-}1}$ in the forward order in the Column-address direction.

On the contrary, in the SDRAM 2, wherein the recording blocks $2_{1\text{-}s\text{-}1}$, with respect to which the writing of the pixel data is completed, are disposed at the end in the Column-address direction (the recording blocks $_{16,\ 32\ \ldots}$ in the SDRAM 2 wherein the number of the Column addresses is 256, the recording blocks $_{32,\ 64\ \ldots}$ wherein the number of the Column addresses is 512) the addresses are shifted as follows.

The Write Row addresses are increased by one count, while the Write Column addresses are decreased by 255 counts. The Write Row addresses and Write Column addresses are thereby shifted to initial address positions of the recording blocks $2_{17,\ 33\ \ldots}$ or recording blocks $2_{33,\ 65}$ . . . , which are disposed adjacent to the writing-completed recording blocks $2_{1\text{-}s\text{-}1}$ in the forward order in the Row-address direction at the initial positions in the Column addresses.

The Read/Write and rotation/anti-rotation controlling device 11 sets the respective Write Row addresses and Write Column addresses, which are calculated in the S212, in the Write Row counter 7 and Write Column counter 8 and goes back to the S203 to thereby continue the writing of the image data in the SDRAM 2.

The Read/Write and rotation/anti-rotation controlling device 11, while repeating the S203-S212 so far described, monitors in the S211 whether or not the number of the lines of the Write line counter 3, which is increased in the S210, is equal to the number of the lines V in the initial image data prior to the implementation of the first image rotation processing thereto. When it is judged that the number of the lines of the Write line counter 3, which is increased in the S210, is equal to the number of the lines V in the initial image data prior to the implementation of the first image rotation processing thereto, the Read/Write and rotation/anti-rotation controlling device 11 judges the completion of the writing processing of all the pixel data in the initial image data with respect to the SDRAM 2 and thereby terminates the writing of the image data.

As described, the writing processing of the image data with respect to the SDRAM 2 is terminated (including the first image rotation processing at the rotation angle of 0°). The first image rotation processing is for storing the groups of the pixel data for each of the lines in the initial image data to each of the corresponding recording blocks $2_{1\text{-}s}$.

Next, after the first image rotation processing is implemented when the image data is written in the SDRAM 2 (in the foregoing example, the rotation angle is 0°, that is the first image rotation processing is not substantially implemented), the second image rotation processing at the rotation angle of 90° is implemented when the image data is read from the SDRAM 2. The implementation of the second image rotation processing is described referring to the flow chart of FIG. 3 and the char of FIG. 7 illustrating the image data layout.

When the reading processing with respect to the SDRAM 2 is commenced, the Read/Write and rotation/anti-rotation controlling device 11 first monitors whether or not the fall timing of the vertical synchronization period VD arrives (S301). The Read/Write and rotation/anti-rotation controlling device 11, when detecting in the S301 that the fall timing of the vertical synchronization period VD arrives, sets the count number of the Read Row counter 9 at H/16−1 and the count number of the Read Column counter 10 at 15, and initializes the count numbers of the Read line counter 5 and Read pixel counter 6 to "0" (S302). His, as described earlier, the number of the pixels for one line in the initial image data prior to the implementation of the first image rotation processing thereto.

The Read/Write and rotation/anti-rotation controlling device 11 thereby first reads the pixel data from the recording block $2_1$ disposed at the top in the arrangement order of the recording blocks $2_{1\text{-}s}$ and designates the recording region disposed at the bottom in the recording block $2_1$ as the read-out recording region.

The Read/Write and rotation/anti-rotation controlling device 11, after the initialization of the count numbers in the S302, monitors whether or not the fall timing of the horizontal synchronization period HD arrives (S303).

The Read/Write and rotation/anti-rotation controlling device 11, when detecting in the S303 that the fall timing of the horizontal synchronization period HD arrives, outputs the Act command to the SDRAM 2 and the Read Row addresses to the SDRAM 2 from the Read Row counter 9 via the address controlling device 13 (S304).

At the timing immediately after the fall of the vertical synchronization period VD, the address controlling device 13 outputs H/16−1 as the Read Row address to the SDRAM 2. The SDRAM 2, after receiving the Act command and H/16−1 as the Read Row address, activates the groups of the recording regions disposed at the Row address H/16−1 so as to be ready for reading processing.

At the timing immediately after the fall of the vertical synchronization period VD, the Read/Write and rotation/anti-rotation controlling device 11 consecutively outputs the Read command to the SDRAM 2 and outputs the Read Column addresses to the SDRAM 2 from the Read Column counter 10 via the address controlling device 13 (S305).

At the timing immediately after the fall of the vertical synchronization period VD, the address controlling device 13 outputs "15" to the SDRAM 2 as the Read column address. The SDRAM 2, after receiving the Read command and the Read Column address "15", reads out the pixel data (x, y) stored in the recording region designated by the Row address (H/16−1) and Column address "15" at the timing of the horizontal synchronization period HD.

When the reading processing in the S305 is completed, the Read/Write and rotation/anti-rotation controlling device 11 increases the count number of the Read Column counter 10 by 16 counts and the count number of the Read pixel counter 6 by one count (S306). In this case, by increasing the Column addresses, the reading processing is shifted from the current read-out recording region in the recording block $2_a$ to the recording block $2_{a+1}$ disposed adjacent thereto in the forward order in the arrangement direction of the recording block $2_a$. The variable a is an optional natural number in the range of 1-s.

The Read/Write and rotation/anti-rotation controlling device 11, after increasing the count numbers, judges whether or not the count number of the Read pixel counter 6, to which the column-address increase is implemented, is equal to a multiple of the number of the lines V in the initial image data (S307).

When it is judged that the count number of the Read pixel counter 6 is not equal to a multiple of the number of the lines V in the initial image data in the S307, the Read/Write and rotation/anti-rotation controlling device 11 judges that the reading processing of the pixel data for one line (V) in the image data after the implementation of the second image rotation processing thereto (90°) is not completed yet. The Read/Write and rotation/anti-rotation controlling device 11, in the wake of the foregoing judgment, judges whether or not the count number of the Read Column counter 10, which is increased by 16 counts in the S306, exceeds the number of the Column addresses in the SDRAM 2 (S308). In the flow chart of FIG. 3, the processing of the S308 is configured with the number of the Column addresses set at 256, which is based on the assumption that the number of the Column addresses in the SDRAM 2 is 256. When the SDRAM 2, wherein the number of the Column addresses is set at any other number (for example, 512), is used, the number of the Column addresses in the S308 is set at the corresponding number of the Column addresses (for example 512).

When it is judged in the S308 that the count number of the Read Column counter 10 does not exceed the number of the Column addresses in the SDRAM 2 (256 in FIG. 3), the Read/Write and rotation/anti-rotation controlling device 11 makes a judgment as follows.

The Read/Write and rotation/anti-rotation controlling device 11 judges that the column address designated on one Column address line in the SDRAM 2 for reading out the pixel data does not reach the end of the Column address line (the end of the Column addresses) in spite of the Column addresses increased in the S306 and remains in an intermediate position on the Column address line.

The Read/Write and rotation/anti-rotation controlling device 11, in the wake of the judgment in the S308, goes back to the S305 to thereby read out the pixel data from the recording regions in the SDRAM 2 in the address position resulted from increasing only the Column addresses by 16 counts in the S306. In this case, the current read-out recording region and the next recording region for read-out share a common Row address. This eliminates the need to designate the Row addresses (S304) at this point. The elimination of the Row address designation (S304) serves to reduce time required for reading the image data. The common Row address can be shared when the recording regions for reading out the pixel data are on the same Column address line.

As long as the common Row address can be shared, the pixel data can be burst read from the SDRAM 2. To share the common Row address at the time of reading is shown in the timing chart of FIG. 18 illustrating the reading processing.

Here, the number of the recording regions constituting the groups of the parallel-disposed recording regions in the recording blocks $2_{1-s}$ is set at 16, and the designation of one Row address leads 16 pixel data to be burst read.

As a result of repeating the S305-S308, when it is judged that the count number of the Read Column counter 10, to which the column address increase is implemented in the S306, exceeds the number of the Column addresses in the SDRAM 2 (256 in the flow chart of FIG. 3), the Read/Write and rotation/anti-rotation controlling device 11 judges that the reading processing of the pixel data for every 16 counts (every recording block) in terms of the Column addresses cannot be any more implemented on the Column address line on which the reading of the pixel data is being processed and thereby moves on to the processing of S309.

The S309 implements the processing that the number of the Write Row addresses of the Read Row counter 9 is increased by H/16 counts and the processing that the number of the Write Column addresses of the Read Column Counter 10 is decreased by 256 counts. Accordingly, in the SDRAM 2 wherein the reading of the pixel data is being processed, the Row addresses are increased by the Row address width of the recording blocks $2_{1-s}$, and the Column addresses are shifted to the initial positions on the Column address line. Accordingly, the designated positions of the read-out recording regions are shifted to initial positions in the Column-address direction (Column address 0) in the SDRAM 2 and also are shifted in the forward order in the Row-address direction by one recording block. When the decrease of the number of the Column addresses by 256 in the S309 results in the calculation result in a minus number, the calculation result is regarded as 0.

Going back to the S304 after the read-out recording regions are shifted in the S309, and thereby the S304-S309 are repeated. In this manner, the processing of reading out the pixel data along the Column-address direction per each of the recording blocks $2_{1-s}$ is implemented until the designated Column address reaches the end in the Column-address direction.

The Read/Write and rotation/anti-rotation controlling device 11, while implementing the reading processing of the pixel data on the Column address line (S304-S309), monitors whether or not the count number of the Read pixel counter 6 is equal to a multiple of the number of the lines V in the initial image data (the number of the pixels for one line in the image data after the implementation of the second image rotation processing thereto) in the S307.

When the count number of the Read pixel counter 6 is equal to a multiple of the number of the lines V in the initial image data (the number of the pixels for one line in the image data after the implementation of the second image rotation processing thereto), the Read/Write and rotation/anti-rotation controlling device 11 judges the completion of the reading processing of the pixel data for one line in the image direction of the image data after the implementation of the second image rotation processing thereto.

When it is judged in the S307 that the reading of all the pixel data for one line in the image data after the implementation of the second image rotation processing thereto is completed, the Read/Write and rotation/anti-rotation controlling device 11 implements the processing of the S310. In the S310, the number of the lines counted by the Read line counter 5 in the read out and created image data (after the implementation of the second image rotation processing thereto at 90°) is increased by one.

After the implementation of the S310, the Read/Write and rotation/anti-rotation controlling device 11 judges whether or not the increased count number of the Read line counter 5 (the number of the lines) exceeds the number of the lines in the read out and created image data (after the implementation of the second image rotation processing thereto at 90°) and the reading processing of all the pixel data constituting the image data is completed. More specifically, the judgment is made based on whether or not the count number of the Read line counter 5 (the number of the lines) is equal to the number of the pixel data H for one line in the initial image data constituting the number of the lines in the image data (after the implementation of the second image rotation processing thereto) (S311).

In the S311, when it is judged that the increased count number of the Read line counter 5 (the number of the lines) is not equal to the number of the pixel data H for one line in the initial image data (the number of the lines in the image data after the implementation of the second image rotation processing thereto at 90°), the Read/Write and rotation/anti-rotation controlling device 11 judges that the reading of all the pixel data in the image data after the implementation of the second image rotation processing hereto from the SDRAM 2 is not completed yet. The Read/Write and rotation/anti-rotation controlling device 11, when judging in the S311 that the reading of all the pixel data in the image data from the SDRAM 2 is not completed yet, calculates the Read Row addresses and Read Column addresses according to the following formulas:

$$\text{Read Row address} = H/16 - 1 - \frac{\text{the count number of the Read line counter 5}}{16}$$

(round down after the decimal point)

$$\text{Read Column address} = 15 - \text{the count number of the Read line counter 5}_{mod} 16$$

According to the foregoing formulas, the following address change is implemented. The recording regions to be designated for image-data reading are shifted to the recording regions in the recording block $2_1$ initially disposed in the arrangement order of the plural recording blocks $2_{1\text{-}s}$ arrayed in the SDRAM 2. The recording block $2_1$ has the recording regions for storing the groups of the pixels disposed in the first line in the image data after the implementation of the first image rotation processing thereto. Further, the next read-out recording region is designated out of the recording regions in the recording block $2_1$.

For better understanding of the designation of the recording regions in the recording block $2_1$, it is noted that the pixel data is stored in the recording blocks $2_{1\text{-}s}$ in the following arrangement order. The pixel data is sequentially stored in the recording regions of the recording blocks $2_{1\text{-}s}$ in such arrangement order as first being sequentially disposed along the Column-address direction in the respective recording blocks $2_{1\text{-}s}$ and then returning to the initial Column address positions in the respective recording blocks to thereafter shift by one address in the Row-address direction.

In the recording region $2_1$ in which the pixel data is stored in the foregoing arrangement order, the recording region is designated so that the next read-out recording region is disposed in a previous address position with respect to the reading-completed pixel data in the foregoing arrangement order. The previous address position in the foregoing arrangement order refers to a previous position in the order of the pixels on an initial line (0) in the image data (initial image data) prior to the implementation of the first image rotation processing thereto and also refers to an initial position of the pixels in the next line in the order of the lines after the implementation of the second image rotation processing (90°).

The Read/Write and rotation/anti-rotation controlling device 11 sets the Read Row addresses and Read Column addresses calculated in the S312 respectively in the Read Row counter 9 and Read Column counter 10 and returns to the S303 to thereby continue the writing processing of the image data with respect to the SDRAM 2.

The Read/Write and rotation/anti-rotation controlling device 11, while repeating the S303-S312 as described, monitors in the S311 whether or not the number of the lines of the Write line counter 3 increased in the S310 is equal to the number of the pixels H for one line in the initial image data. When it is judged in the S311 that the increased number of the lines of the Write line counter 3 is equal to H, the Read/Write and rotation/anti-rotation controlling device 11 judges that the reading of all the pixel data of the image data from the SDRAM 2 is successfully completed, thereby terminating the reading processing of the image data.

As described, the reading processing of the image data with respect to the SDRAM 2 (including the second image rotation processing at the rotation angle of 90°) is terminated. The second image rotation processing reads each pixel data per recording block from the respective recording blocks $2_{1\text{-}s}$, in which the pixel data for each line in the initial image data is stored, to thereby create the image for each line in the image direction after the implementation of the second image rotation processing. At that time, each pixel data is read per recording block from the recording blocks $2_{1\text{-}s}$ so that the common Row address can be designated in the reading processing of the consecutive plural pixel data, thereby enabling the burst read to be implemented.

Figure 5:
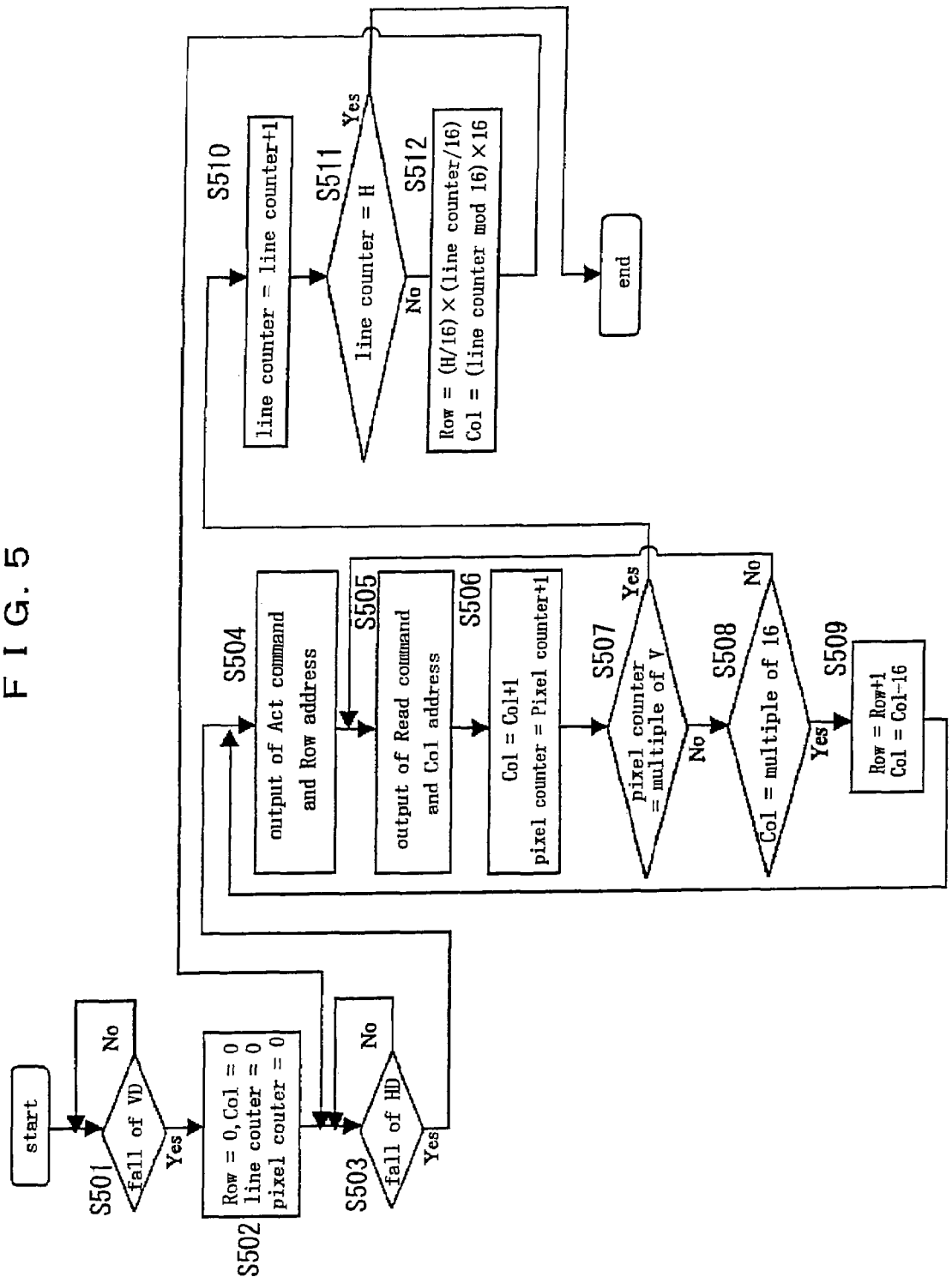
FIG. 5 is a flow chart illustrating a second example of image data reading with respect to SDRAM according to the preferred embodiment of the present invention.

Next is described the case, wherein the rotation angle of the first image rotation processing implemented when the image data is written in the SDRAM 2 is 90° and the rotation angle of the second image rotation processing implemented when the image data is read from the SDRAM 2 is 0°, referring to the flow charts of FIGS. 4 and 5 and the chart of FIG. 7 showing the image data layout in the SDRAM 2. When the rotation angle of the second image rotation processing is 0°, the second image rotation processing is not substantially implemented.

First, referring to the flow chart of FIG. 4 and the chart of FIG. 7 showing the image data layout, the writing processing of the image data with respect to the SDRAM 2 (including the first image rotation processing at the rotation angel of 90°) is described.

When the writing processing with respect to the SDRAM 2 is commenced, the Read/Write and rotation/anti-rotation controlling device 11 monitors whether or not the fall timing of the vertical synchronization period VD arrives (S401).

When it is detected in the S401 that the fall timing of the vertical synchronization period VD arrives, the Read/Write and rotation/anti-rotation controlling device 11 sets the count number of the Write Row counter 7 at HV/256-V/16 and the count number of the Write Column counter 8 at 240. The Read/Write and rotation/anti-rotation controlling device 11 also initializes the count number of the Write line counter 3 and the count number of the Write pixel counter 4 to "0" (S402).

The Read/Write and rotation/anti-rotation controlling device 11 thereby designates the recording regions in the recording block $2_s$ last disposed in the arrangement order of the recording blocks $2_{1\text{-}s}$ as the first recording region in which the pixel data is written. The Read/Write and rotation/anti-rotation controlling device 11 also designates the recording region initially disposed in the recording block $2_s$ as the write-in recording region.

The Read/Write and rotation/anti-rotation controlling device 11, after implementing the initialization of the count numbers in the S402, monitors whether or not the fall timing of the horizontal synchronization period HD arrives (S403).

The Read/Write and rotation/anti-rotation controlling device 11, when detecting the fall timing of the horizontal synchronization period HD arrives in the S403, outputs the Act command to the SDRAM 2 and also outputs the Write Row addresses from the Write Row counter 7 via the address controlling device 13 (S404).

At the timing immediately after the fall of the vertical synchronization period VD, the address controlling device 13 outputs HV/256-V/16 as the Read Row address to the SDRAM 2. The SDRAM 2, after receiving the Act command and HV/256-V/16, activates the groups of the recording regions disposed at the Row address HV/256-V/16.

At the timing immediately after the fall of the vertical synchronization period VD, the Read/Write and rotation/anti-rotation controlling device 11 consecutively outputs the Write command to the SDRAM 2 and also outputs the Write Column address to the SDRAM 2 from the Write Column counter 8 via the address controlling device 13 (S405).

At the timing immediately after the fall of the vertical synchronization period VD, the address controlling device 13 outputs 240 to the SDRAM 2 as the Write Column address. The SDRAM, after receiving the Write command and the Write Column address 240, writes the pixel data (x, y) of the image data input to the SDRAM 2 at the timing of the horizontal synchronization period HD in the address position designated by the Write Row address and Write Column address in the S404 and S405.

The Read/Write and rotation/anti-rotation controlling device 11, when the writing processing of the S405 is completed, decreases the count number of the Write column counter 8 by 16 counts and increases the count number of the Write pixel counter 4 by one count (S406). The Read/Write and rotation/anti-rotation controlling device 11, in the wake of increasing and decreasing the count numbers, monitors whether or not the increased count number of the Write pixel counter 4 is equal to a multiple of the number of the pixels H for one line in the initial image data prior to the implementation of the first image rotation processing thereto (S407).

When it is judged in the S407 that the count number of the Write pixel counter 4 is not equal to a multiple of the number of the pixels H for one line in the initial image data, the Read/Write and rotation/anti-rotation controlling device 11 judges that the writing of the pixel data for one in the initial image data prior to the implementation of the first image rotation processing thereto is not completed yet. The Read/Write and rotation/anti-rotation controlling device 11, in the wake of the judgment, judges whether or not the count number of the Write Column counter 8 decreased by 16 counts in the S406 is decreased to below 0 (S408).

When it is judged in the S408 that the count number of the Write Column counter 8 is not decreased to below 0, the Read/Write and rotation/anti-rotation controlling device 11 makes a judgment as follows.

For better understanding of the judgment in the S408, it is necessary to well understand the regularity in designating the write-in recording regions when the first image rotation processing (90°) is implemented. The regularity is set as follows.

The initial address position ((H−16)V/256, 240) or ((H−32)V/512, 496) in the recording block $2_s$ last disposed is designated as the starting point.

The write-in recording region is shifted per each of the recording blocks $2_{1\text{-}s}$ backward in the arrangement order of the recording blocks $2_{1\text{-}s}$.

When the write-in recording regions are shifted, the positions of the designated recording regions are consistent in the respective recording blocks $2_{1\text{-}s}$.

The consistency in the positions of the designated write-in recording regions continues until the write-in recording region shifted per each of the recording blocks $2_{1\text{-}s}$ reaches the recording block $2_1$ initially disposed in the arrangement order.

When the write-in recording region reaches the recording block $2_1$ initially disposed in the arrangement order, the designation of the next write-in recording region returns to the recording block $2_s$ last disposed in the arrangement order.

When the designation of the write-in recording region returns to the recording block $2_s$ disposed at the bottom in the arrangement order, the position of the write-in recording region designated in the recording block $2_s$ is shifted by one recording region in the forward order in the arrangement order of the recording blocks.

In designating the write-in recording region according to the foregoing regularity, the judgment made in the S408 judges whether or not the designation of the write-in recording region reaches the Column address "0".

When it is judged that the count number of the Write Column counter 8 (Write Column address) is not below 0 in the S408, the Read/Write and rotation/anti-rotation controlling device 11 judges that the Column address of the next write-in recording region decreased in the S406 does not reach "0".

The Read/Write and rotation/anti-rotation controlling device 11, in the wake of the foregoing judgment in the S408, goes back to the S405 to thereby write the pixel data. In this case, as shown in FIG. 7, the recording region in which the writing is being processed and the next write-in recording region share a common Row address. Therefore, it is unnecessary to designate the Row address (S404). The elimination of the Row address designation (S404) results in reducing time required for writing the image data. The common Row address can be shared until the designation of the write-in recording region reaches the Column address "0".

When the count number of the Write Column counter 8 (Write Column address) is below 0 in the S408 in consequence of repeating the S405-S408, the Read/Write and rotation/anti-rotation controlling device 11 judges that it is not possible to designate the next write-in recording region without changing the Row address.

The Read/Write and rotation/anti-rotation controlling device 11, in the wake of the foregoing judgment, makes the processing change to the S409.

In the S409, the Write Row addresses of the Write Row counter 7 are decreased by V/16 counts, and the Write Column addresses of the Write Column counter 8 are increased by 256 counts. Thus, the designation of the write-in recording region is shifted to any of the recording blocks $2_{1\text{-}s}$ satisfying the following conditions.

The recording region is in the recording block disposed at the bottom in the Column-address direction.

The recording region is in the recording block shifted by one recording block backward in the Row-address direction with respect to the recording block having the last image-data-written recording region.

The position of the write-in recording region in the recording block is same as the last image-data-written recording region.

After the designation of the write-in recording region is implemented in the S409, the Read/Write and rotation/anti-rotation controlling device 11 goes back to the S404 and repeats the S404-S409 to thereby continue the writing of the pixel data in the recording blocks $2_{1\text{-}s}$.

The Read/Write and rotation/anti-rotation controlling device 11, while writing the pixel data in the respective recording regions in the recording blocks $2_{1\text{-}s}$ (S404-S409), monitors in the S407 whether or not the count number of the Write pixel counter 4 is equal to a multiple of the number of the pixels H for one line in the initial image data.

When it is judged that the count number of the Write pixel counter 4 is equal to a multiple of the number of the pixels H for one line in the initial image data, the Read/Write and rotation/anti-rotation controlling device 11 judges that the writing processing of all the pixel data for one line in the initial image data with respect to the SDRAM is successfully completed. In this case, the recording block in which the pixel data is written is the first recording block 21 initially disposed in the arrangement order of the recording blocks $2_{1\text{-}s}$.

When judging that the all the pixel data for one line in the initial image data is written so as to be dispersed across the recording blocks $2_{1\text{-}s}$, the Read/Write and rotation/anti-rotation controlling device 11 implements the processing of S410.

In the S410, the number of the lines in the image data counted by the Write line counter 3 is increased by one. After the implementation of the S410, the Read/Write and rotation/anti-rotation controlling device 11 judges whether or not the increased number of the lines of the Write line counter 3 is equal to the number of the lines V in the initial image data (S411).

When it is judged in the S411 that the increased number of the lines of the Write line counter 3 is not equal to the number of the lines V in the initial image data, the Read/Write and rotation/anti-rotation controlling device 11 judges that the writing processing of all the pixel data in the initial image data with respect to the SDRAM 2 is not completed yet.

The Read/Write and rotation/anti-rotation controlling device 11, in the wake of judging that the writing processing of all the pixel data in the image data with respect to the SDRAM 2 is not completed yet in the S411, calculates the Write Row address and the Write Column address as follows.

$$\text{Write Row address} = HV/256 - \frac{V - \text{the count number of the Write line counter 3}}{16}$$

(round down after the decimal point)

$$\text{Write Column address} = 240 + \text{the count number of the Write line counter 3} \bmod 16$$

According to the foregoing formulas, the designation of the write-in recording region is shifted to any of the recording blocks $2_{1\text{-}s}$ satisfying the following conditions.

The recording region is in the recording block $2_s$ disposed at the bottom in the arrangement order of the recording blocks $2_{1\text{-}s}$.

The position of the write-in recording region designated in the recording block $2_s$ is shifted by one recording region in the forward order in the arrangement order of the recording regions in the recording block $2_1$ having the last image-data-written recording region.

"in the forward order in the arrangement order of the recording regions in the recording block" means in the forward order in the Column-address direction and Row-address direction in the recording block.

The Read/Write and rotation/anti-rotation controlling device 11 sets the Write Row addresses and Write Column addresses calculated in the S412 in the Write Row counter 7 and Write Column counter 8 and goes back to the S403 to thereby continue the writing processing of the pixel data with respect to the SDRAM 2.

By repeating the described S403-S412, the Read/Write and rotation/anti-rotation controlling device 11 monitors whether or not the number of the lines of the Write line counter 3 increased in the S411 is equal to the number of the lines V in the initial image data prior to the implementation of the first image rotation processing thereto. When it is judged in the S411 that the increased number of the lines of the Write line counter 3 is equal to the number of the lines V in the initial image data prior to the implementation of the first image rotation processing thereto, the Read/Write and rotation/anti-rotation controlling device 11 judges that the writing processing of all the pixel data in the initial image data with respect to the SDRAM 2 is completed, thereby terminating the writing processing of the image data.

As described, the writing processing of the image data with respect to the SDRAM 2 (including the first image rotation processing at the rotation angle of 90°) is terminated. The first image rotation processing stores each pixel data taken out in the direction of the lines in the initial image data while sequentially changing the data-storing recording blocks of a plurality of the respective recording blocks $2_{1\text{-}s}$ in the Column-address direction.

Next is described the case, in which the first image rotation processing (in the foregoing example, at the rotation angle of 90°) is first implemented when the image data is written in the SDRAM 2 and then the second image rotation processing at the rotation angle of 0° (substantially no implementation of the second image rotation processing) is implemented when the image data is read from the SDRAM 2, referring to the flow chart of FIG. 5 and the chart of FIG. 7 showing the image data layout.

When reading processing with respect to the SDRAM 2 is commenced, the Read/Write and rotation/anti-rotation controlling device 11 first monitors whether or not the fall timing of the vertical synchronization period VD arrives (S501).

The Read/Write and rotation/anti-rotation controlling device 11, as a result of detecting in the S501 the fall timing of the vertical synchronization period VD arrives, initializes the count numbers of the Read Row counter 9, Read Column counter 10, Read line counter 5 and Read pixel counter 6 to "0" (S502).

The Read/Write and rotation/anti-rotation controlling device 11, after initializing the count numbers in the S502, monitors whether or not the fall timing of the horizontal synchronization period HD arrives (S503).

When it is detected that the fall timing of the horizontal synchronization period HD arrives in the S503, the Read/Write and rotation/anti-rotation controlling device 11 outputs the Act command to the SDRAM 2 and also outputs the Read Row addresses from the Read Row counter 9 via the address controlling device 13 to the SDRAM 2 (S504).

At the timing immediately after the fall of the vertical synchronization period VD, the address controlling 13 outputs "0" as the Read Row address to the SDRAM 2. The SDRAM 2, after receiving the Act command and Read Row address "0", activates the groups of recording regions in the Row address "0" so as to be ready for writing processing.

At the timing immediately after the fall of the vertical synchronization period VD, the Read/Write and rotation/anti-rotation controlling device 11 consecutively outputs the Read command to the SDRAM 2 and also outputs the Read Column addresses to the SDRAM 2 from the Read Column counter 10 via the address controlling device 13 (S505).

At the timing immediately after the fall of the vertical synchronization period VD, the address controlling 13 outputs "0" as the Read Column address to the SDRAM 2. The SDRAM 2, after receiving the Read command and Read Column address "0", reads the pixel data (x, y) stored in the recording region addressed by the Row address "0" and Column address "0" at the timing of the horizontal synchronization period HD.

When the reading processing of the S505 is completed, the Read/Write and rotation/anti-rotation controlling device 11 increases the count number of the Read Column counter 10 by one count and the count number of the Read pixel counter 6 by one count (S506). In this case, by increasing the Column addresses, the reading processing is shifted from the current read-out recording region in the recording block $2_1$ to the recording region disposed adjacent in the forward order in the arrangement direction of the recording block $2_1$.

The Read/Write and rotation/anti-rotation controlling device 11 judges whether or not the Column-address-increased count number of the Read pixel counter 6 is equal to a multiple of the number of the pixels H for one line in the initial image data (S507).

When it is judged in the S507 that the count number of the Read pixel counter 6 is not equal to a multiple of the number of the lines V in the initial image data corresponding to the number of the pixels for one line in the image data after the implementation of the second image rotation processing thereto, the Read/Write and rotation/anti-rotation controlling device 11 judges that the reading of the pixel data for one line in the image data after the implementation of the second image rotation processing thereto (90°) is not completed yet. The Read/Write and rotation/anti-rotation controlling device 11, in the wake of the foregoing judgment, judges whether or not the one-count-increased count number of the Read Column counter 10 exceeds a multiple of the number of the Column addresses "16" in the recording blocks $2_{1-s}$ (S508). The flow chart of FIG. 5 shows the processing of the S508 with the number of the Column addresses in the recording blocks $2_{1-s}$ set at 16. When the number of the Column addresses in the recording blocks $2_{1-s}$ is set at any other number (for example, 32), the number of the Column addresses in the recording blocks $2_{1-s}$ is set at the same number as the Column addresses (32 or the like) in the S508.

When it is judged in the S508 the count number of the Read Column counter 10 does not exceed a multiple of the number of the Column addresses in the recording blocks $2_{1-s}$ (16 in FIG. 3), the Read/Write and rotation/anti-rotation controlling device 11 makes a judgment as follows.

The Read/Write and rotation/anti-rotation controlling device 11 judges that the Column address designated on a group of the parallel-disposed recording regions in the recording blocks $2_{1-s}$ for reading the pixel data does not reach the end of the group of the parallel-disposed recording regions (the end of the Column addresses) in spite of the address-increase processing of the S506 and remains in an intermediate position on the groups of parallel-disposed recording regions.

The Read/Write and rotation/anti-rotation controlling device 11, in the wake of the foregoing judgment, goes back to the S505 to thereby read the pixel data from the recording region in the SDRAM 2 at the address position resulting from increasing only the Column addresses by one count in the S506. In this case, as shown in FIG. 18, the current read-out recording region and the next recording region for read-out share a common Row address. It is, therefore, unnecessary to designate the Row address (S504) at this point. The elimination of the Row address designation (S504) results in a reduction of time required for reading processing of the pixel data. The common Row address can be shared when the recording regions for the reading out the pixel data are in the same group of the parallel-disposed recording regions. Thus, as long as the common Row address can be shared, the pixel data can be burst read from the SDRAM 2.

As a result of repeating the S505-S508, when the count number of the Read Column counter 10 after the Column addresses are increased in the S506 exceeds a multiple of the number of the Column addresses in the recording blocks $2_{1-s}$ (16 in the flow chart of FIG. 3), the Read/Write and rotation/anti-rotation controlling device 11 judges that the reading processing of the pixel data cannot be continued in the group of parallel-disposed recording regions in which the pixel data is being read out and makes the processing change to the S509.

In the S509, the Write Row addresses of the Read Row counter 9 are increased by one count, and the Write Column addresses of the Read Column counter 10 are decreased by 16 counts. Accordingly, in the SDRAM 2 in which the pixel data is being read out, the Row addresses are increased by the Row address width of the recording blocks $2_{1-s}$, and the Column addresses are shifted to the initial positions on the Column address line.

In the foregoing manner, the position of the designated read-out recording region, after the number of the groups of the parallel-disposed recording regions for reading out the image data is increased by one, is shifted to the initial position in the group of the read-out parallel-disposed recording regions resulting from the Column address increase.

When the decrease of the number of the Column addresses by 16 in the S509 results in the calculation result in a minus number, the calculation result is regarded as 0.

After shifting the read-out recording region in the S509, goes back to the S504 to thereby repeat the S504-S509. The reading processing of the pixel data with respect to a recording region in the recording blocks $2_{1-s}$ is implemented until reaching the end in the arrangement order of the recording regions in the recording blocks $2_{1-s}$.

The Read/Write and rotation/anti-rotation controlling device 11, while reading the pixel data from the recording regions in the recording blocks $2_{1-s}$ (S504-S509), monitors in the S507 whether or not the count number of the Read pixel counter 6 is equal to a multiple of the number of the lines V in the initial image data (the number of the pixels for one line in the image data after the implementation of the second image rotation processing thereto).

When the count number of the Read pixel counter 6 is equal to a multiple of the number of the lines V in the initial image data (the number of the pixels for one line in the image data after the implementation of the second image rotation processing thereto), the Read/Write and rotation/anti-rotation controlling device 11 judges that the reading processing of the pixel data for one line in the image direction of the image data after the implementation of the second image rotation processing thereto is completed.

When it is judged in the S507 that the reading processing of the pixel data for one line in the image data after the implementation of the second image rotation processing thereto is completed, the Read/Write and rotation/anti-rotation controlling device 11 implements the processing of the S510. The processing of the S510 increases by one the number of the lines counted by the Read line counter 5 in the image data (after the second image rotation processing (90°) created by the reading processing.

After the S510 is implemented, the Read/Write and rotation/anti-rotation controlling device 11 judges whether or not the count number of the Read line counter 5 (the number of the lines) exceeds the number of the lines in the image data (after the implementation of the second image rotation processing thereto at 90°) created by the reading processing and all the pixel data constituting the image data is successfully read out. More specifically, the judgment is made based on whether or not the count number of the Read line counter 5 (the number of the lines) is equal to the number of the pixels "H" for one line in the initial image data constituting the number of the lines in the image data (after the implementation of the second image rotation processing thereto) (S511).

When it is judged in the S511 that the increased count number of the Read line counter 5 (the number of the lines) is not equal to the number of the pixels H for one line in the initial image data (after the implementation of the second image rotation processing thereto at 90°), the Read/Write and rotation/anti-rotation controlling device 11 judges that the reading processing of all the pixel data in the image data with respect to the SDRAM 2 is not completed yet.

When it is judged in the S511 that the reading processing of all the pixel data in the image data with respect to the SDRAM 2 is not completed yet, the Read/Write and rotation/anti-rotation controlling device 11 calculates the Read Row address and Read Column address according to the following formulas.

$$\text{Write Row address} = H/16 \times \frac{\text{the count number of the Write line counter 3}}{16}$$

(round down after the decimal point)

$$\text{Write Column address} = \text{the count number of the Write line counter 3}_{mod\ 16} \times 16$$

According to the foregoing formulas, the following address change is implemented. When the recording Blocks $2_{1\text{-}s\text{-}1}$, with respect to which the reading of the pixel data is already completed, are not disposed at the end in the Column-address direction, the address shift is as follows.

The Read Row addresses are decreased by 16 counts, and the Read Column addresses are increased by one count. The Read Row addresses and Read Column addresses are thereby shifted to the initial address positions in the next recording blocks $2_{1\text{-}s}$ adjacent to the recording blocks $2_{1\text{-}s\text{-}1}$, with respect to which the reading of the pixel data is already completed, in the forward order in the Column-address direction.

When the recording blocks $2_{1\text{-}s\text{-}1}$, with respect to which the reading of the pixel data is completed, are disposed at the end in the Column-address direction (in the case of the recording blocks $2_{16\text{-}32\ \ldots}$ in the SDRAM 2 wherein the number of the Column addresses is 256, and in the case of the recording blocks $2_{32\text{-}64\ \ldots}$ in the SDRAM 2 wherein the number of the column addresses is 512), the address shift is as follows.

The Read Row addresses are increased by one count, and the Read Column addresses are decreased by 256 counts. Accordingly, the Read Row addresses and Read Column addresses are shifted to the initial positions in the recording blocks $2_{17,\ 33\ \ldots}$ or recording blocks $2_{33,\ 65\ \ldots}$ disposed in the forward order in the Row-address direction with respect to the recording blocks $2_{1\text{-}s\text{-}1}$, from which the pixel data is successfully read out, and at the initial positions in the Column-addresses.

The Read/Write and rotation/anti-rotation controlling device 11 sets the Read Row addresses and Read Column addresses, which are calculated in the S512, in the Read Row counter 9 and Read Column counter 10, and goes back to the S503 to thereby continue the reading of the pixel data with respect to the SDRAM 2.

The Read/Write and rotation/anti-rotation controlling device 11, while repeating the described S503-S512, monitors in the S511 whether or not the number of the lines of the Read line counter 5 increased in the S510 is equal to the number of the pixels H for one line in the initial image data constituting the number of the lines in the image data after the implementation of the second image rotation processing thereto. When it is judged that the number of the lines of the Read line counter 5 is equal to H, the Read/Write and rotation/anti-rotation controlling device 11 judges the completion of the reading processing of all the pixel data in the image data after the implementation of the second image rotation processing thereto with respect to the SDRAM 2, thereby terminating the reading processing of the image data.

As described, the reading processing of the image data with respect to the SDRAM 2 (including the second image rotation processing at the rotation angle of 0°) is terminated. In this case, in consequence of the previously-implemented first image rotation processing (the writing processing of the image data), the groups of the pixel data for each of the lines in the image data after the implementation of the second image rotation processing thereto are stored in the recording blocks $2_{1\text{-}s}$. Therefore, the second image rotation processing scans the groups of the pixel data for each of the lines in the image data after the implementation of the second image rotation processing thereto in the respective recording blocks $2_{1\text{-}s}$ in the Column-address direction and reads out the pixel data therefrom. When the scanning and reading are implemented, the pixel data is sequentially read out from the respective recording blocks $2_{1\text{-}s}$ in the Column-address direction. As a result, a common Row address can be designated in the reading processing of the consecutive plural pixel data, thereby enabling the burst read to be implemented.

Next is described the case, in which the pixel data for n pixels is first averaged to be thereafter written and read with respect to the number n of the recording regions in the SDRAM 2, referring to the flow charts of FIGS. 8-11. This case is basically same as in the flow charts of FIGS. 2-5. FIGS. 8, 9, 10, and 11 respectively correspond to FIGS. 2, 3, 4, and 5.

Figure 8:
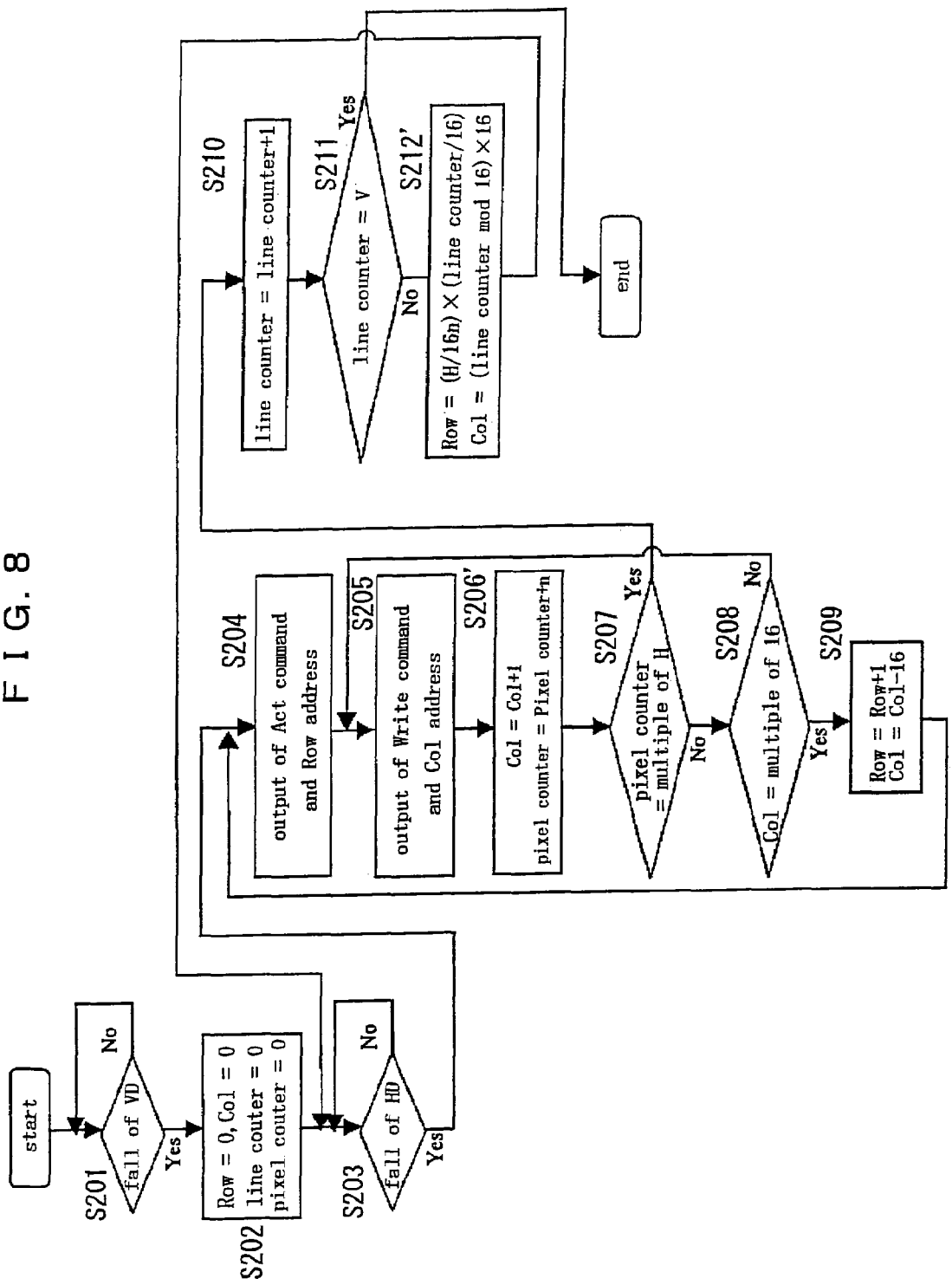
FIG. 8 is a flow chart illustrating a third example of image data writing with respect to SDRAM according to the preferred embodiment of the present invention.
Figure 9:
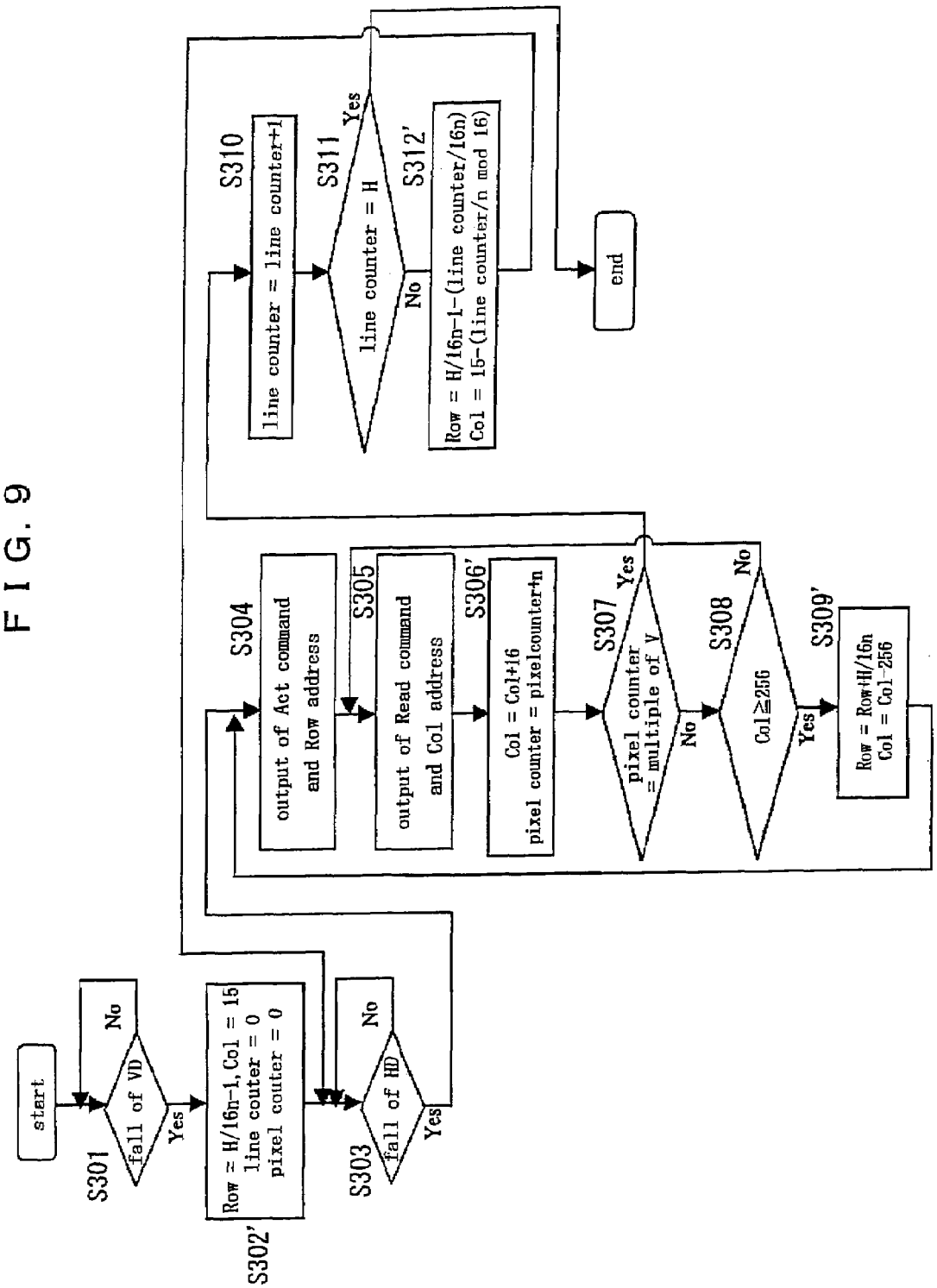
FIG. 9 is a flow chart illustrating a third example of image data reading with respect to SDRAM according to the preferred embodiment of the present invention.

First is described the case, in which the rotation angle of the first image rotation processing implemented when the image data is written in the SDRAM 2 is 0° and the rotation angle of the second image rotation processing implemented when the image data is read from the SDRAM 2 is 90°, referring to the flow charts of FIGS. 8 and 9.

The writing processing of the image data with respect to the SDRAM 2 (including the first image rotation processing at the rotation angle of 0°) is first described referring to the flow chart of FIG. 8. This writing processing is basically same as in the flow chart of FIG. 2. Therefore, the processing steps in FIG. 8 identical to those in FIG. 2 have the same reference numerals shown therein and are not described here.

The flow charts of FIGS. 2 and 8 are different in S206' and S212'. The S206 and S206' implement the processing of increasing the Column-address count number of the Write column counter 8 and the pixel count number of the Write pixel counter 4 after the pixel data is written in a recording region in the SDRAM 2. In the processing of FIG. 2, in which the pixel data is written for each pixel, the pixel count number is increased by one count. In FIG. 8, the pixel data is written per n pixels and the pixel count number is accordingly increased by n counts. The S206' is different from the S206' in implementing the foregoing processing.

The S212 and S212', after writing the pixel data for one line in the image data with respect to the SDRAM 2, designate the next write-in recording region in the SDRAM 2. In the processing of FIG. 2, wherein the pixel data is written for each pixel, the Write Row address for the next recording region designated in the S212 is renewed according to the following formula:

$$\text{Write Row address} = H/16 \times \frac{\text{the count number of the Write line counter 3}}{16}$$

In contrast to that, in FIG. 8, in response to writing the pixel data per n pixels, the Write Row address for the next recording region designated in the S212' is renewed according to the following formula:

$$\text{Write Row address} = H/16n \times \frac{\text{the count number of the Write line counter 3}}{16}$$

The S212' is different from the S212 in implementing the foregoing processing.

Next is described the case, in which the first image rotation processing is first implemented when the image data is written in the SDRAM 2 (the rotation angle is 0° in the foregoing example meaning that the first image rotation processing is not substantially implemented), and then the second image rotation processing at the rotation angle of 90° is implemented when the image data is read from the SDRAM 2 referring to the flow chart of FIG. 9.

This writing processing is basically same as in the flow chart of FIG. 3. Therefore, the processing steps in FIG. 9 identical to those in FIG. 3 have the same reference numerals shown therein and are not described here.

The processing in the flow chart of FIG. 9 is different to the same of FIG. 3 in S302', S306', S309', and S312'. The S302 and S302' designate the addresses of the next read-out recording region immediately after the fall of the vertical synchronization period VD. The Read Row address in the S302 is designated according to the following formula:

$$\text{Read Row address} = H/16 - 1$$

In contrast to that, in the processing of the S302', in response to collectively implementing the writing processing per n pixels, the Read Row address is designated according to the following formula:

$$\text{Read Row address} = H/16\,n - 1$$

The S302' is different from the S302 in implementing the foregoing processing.

The S306 and S306' first read the pixel data from a recording region in the SDRAM 2 and then increase the Column-address count number of the Write Column counter 8 and the pixel count number of the Write pixel counter 4. In the processing of FIG. 3, wherein the pixel data is read for each pixel, the pixel count number is increased by one count. In contrast to that, in the processing of FIG. 9, in response to reading the pixel data per n pixels, the pixel count number is increased by n counts. The S306' is different from the S306 in implementing the foregoing processing.

The S309 and S309' designate the next read-out recording region including the Row address change. In the processing of FIG. 3, in which the pixel data is written for each pixel, the Row-address count number of the Read Row counter 9, which is the Row address of the next read-out recording region in the S309, is renewed according to the following formula:

$$\text{Read Row address (new)} = \text{Read Row address (old)} + H/16$$

In contrast to that, in the processing of FIG. 9, in response to writing the pixel data per n pixels, the Row-address count number of the Read Row counter 9 in the S309' is renewed according to the following formula:

$$\text{Read Row address (new)} = \text{Read Row address (old)} + H/16n$$

The S309' is different to the S309 in implementing the foregoing processing.

The S312 and S312' designate the next read-out recording region after reading the pixel data for one line in the reading-processed image data from the SDRAM 2. In the processing of FIG. 3, in which the pixel data is written per pixel, the Row-address count number of the Read Row counter 9, which is the Row address of the next recording region to be designated in the S312, is renewed according to the following formula:

$$\text{Read Row address} = H/16 - 1 - \frac{\text{the count number of the Read line counter 5}}{16}$$

In contrast to that, in the processing of FIG. 8, in response to writing the pixel data per n pixels, the Row-address count number of the Read Row counter 9 in the S312' is renewed according to the following formula:

$$\text{Read Row address} = H/16n - 1 - \frac{\text{the count number of the Read line counter 5}}{16n}$$

In the processing of FIG. 3, wherein the pixel data is written per pixel, the Column-address count number of the Read column counter 10 in the S312, which is the Column address of the next recording region to be designated is renewed according to the following formula:

Column address=15−the count number of the Read line counter $5_{mod}16$

In contrast, in the processing of FIG. 8, in response to writing the pixel data per n pixels, the Column-address count number of the Read Column counter 10 in the S312' is renewed according to the following formula:

$$\text{Column address} = 15 - \frac{\text{the count number of the Read line counter 5}}{n \bmod 16}$$

The S312' is different to the S312 in implementing the foregoing processing.

Figure 10:
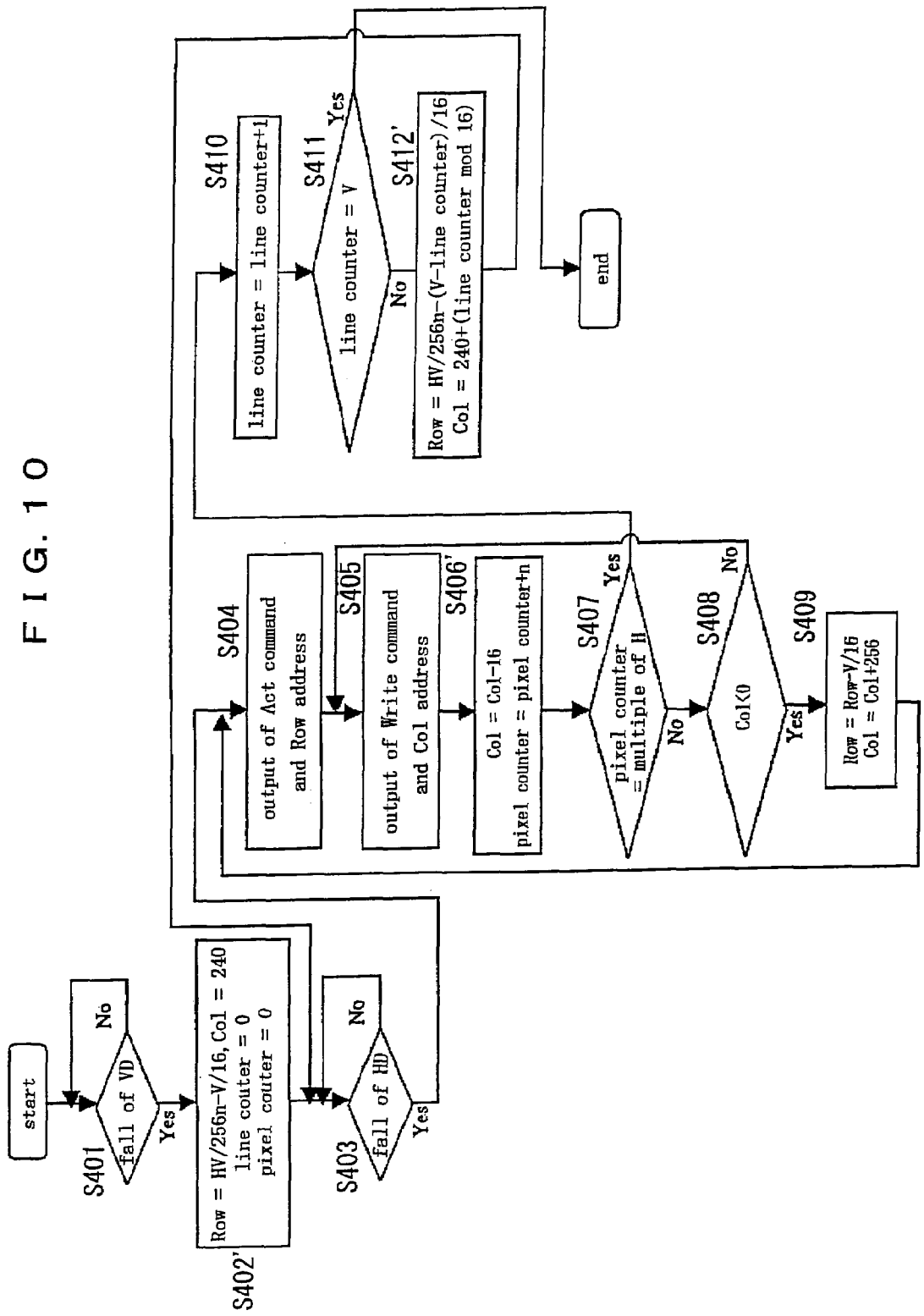
FIG. 10 is a flow chart illustrating a fourth example of image data writing with respect to SDRAM according to the preferred embodiment of the present invention.
Figure 11:
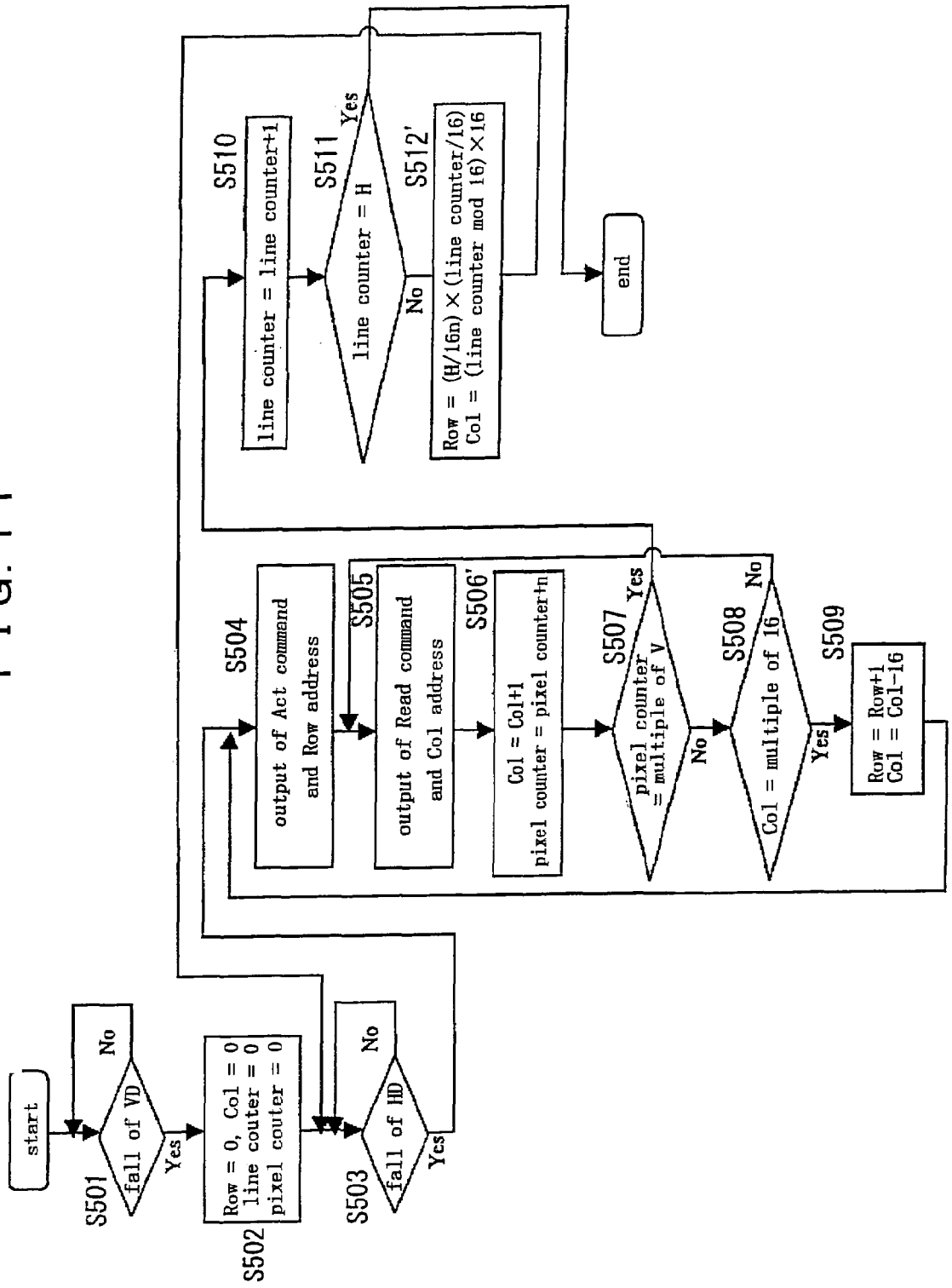
FIG. 11 is a flow chart illustrating a fourth example of image data reading with respect to SDRAM according to the preferred embodiment of the present invention.

Next is described the case, in which the rotation angle of the first image rotation processing implemented when the image data is written in the SDRAM is 90° and the rotation angle of the second image rotation processing implemented when the image data is read from the SDRAM 2 is 0°, referring to the flow charts of FIGS. 10 and 11.

The writing processing of the image data with respect to the SDRAM 2 (including the first image rotation processing at the rotation angle of 90°) is first described referring to the flow chart of FIG. 10. This writing processing is basically same as in the flow chart of FIG. 4. Therefore, the processing steps in FIG. 10 identical to those in FIG. 4 have the same reference numerals shown therein and are not described here.

The flow charts of FIGS. 10 and 4 are different in S402', S406', and S412'. The S402 and S402' designate the addresses of the next write-in recording region immediately after the fall of the vertical synchronization period VD. The Row-address count number of the Write Row counter 7 in the processing of S402, which is the Write Row address, is renewed according to the following formula:

Write Row address=HV/256−V/16

In contrast to that, in the processing of the S402', in response to writing the pixel data per n pixels, the Row-address count number of the Write Row counter 7 is designated according to the following formula:

Write Row address=HV/256n−V/16

The S402' is different to the S402 in implementing the foregoing processing.

The 406 and S406' increase the Column-address count number of the Write Column counter 8 and the pixel count number of the Write pixel counter 4 after the pixel data is written in a recording region in the SDRAM 2. In the processing of FIG. 4, wherein the pixel data is written per pixel, the pixel count number is increased by one count. In the processing of FIG. 10, in response to writing the pixel data per n pixels, the pixel count number is increased by n counts. The S406' is different to the S406 in implementing the foregoing processing.

The S412 and S412' designate the next write-in recording region after the pixel data for one line in the initial image data (for one recording block of the recording blocks $2_{1-s}$) is written in the SDRAM 2. In the processing of FIG. 4, in which the pixel data is written per pixel, the Row-address count number of the Write Row counter 7, which is the Row address of the next recording region to be designated in the S402, is renewed according to the following formula:

$$\text{Write Row address} = HV/256 - \frac{V - \text{the count number of the write line counter 3}}{16}$$

In contrast to that, in the processing of FIG. 10, in response to writing the pixel data per n pixels, the Row-address count number of the Write Row counter 7 in the S412' is designated according to the following formula:

$$\text{Write Row address} = HV/256n - \frac{V - \text{the count number of the write line counter 3}}{16}$$

The S412' is different from the S412 in implementing the foregoing processing.

Next is described the case, in which the first image rotation processing (at the rotation angle of 90° in the foregoing example) is first implemented when the image data is written in the SDRAM 2 and the second image rotation processing at the rotation angle of 0 is implemented when the image data is read from the SDRAM 2, referring to the flow chart of FIG. 11.

This writing processing is basically same as in the flow chart of FIG. 5. Therefore, the processing steps in FIG. 11 identical to those in FIG. 5 have the same reference numerals shown therein and are not described here.

The flow charts of FIGS. 11 and 5 are different in S506' and S512'.

The S506 and S506' increase the Column-address count number of the Write Column counter 8 and the pixel count number of the Write pixel counter 4 after the pixel data is read from a recording region in the SDRAM 2. In the processing of the S506 shown in FIG. 5, in which the pixel data is read per pixel, the pixel count number of the Read pixel counter 6 is increased by one count. In the processing of the S506' shown in FIG. 11, in response to reading the pixel data per n pixels, the pixel count number of the Read pixel counter 6 is increased by n counts. The S506' is different from the S506 in implementing the foregoing processing.

The S512 and S512' designate the next read-out recording region after the pixel data for one line in the reading-processed image data is read from the SDRAM 2. In the processing of the S512 of FIG. 5, in which the pixel data is read per pixel, the Row-address count number of the Read Row counter 9, which is the Row address of the next recording region to be designated in the S512, is renewed according to the following formula:

$$\text{Write Row address} = H/16 \times \frac{\text{the count number of the Read line counter 5}}{16}$$

In contrast to that, in the processing of the S512' shown in FIG. 11, in response to writing the pixel data per n pixels, the Row-address count number of the Read Row counter 9 is renewed according to the following formula:

$$\text{Write Row address} = H/16n \times \frac{\text{the count number of the Read line counter 5}}{16}$$

The S512' is different to the S512 in implementing the foregoing processing.

Figure 14:
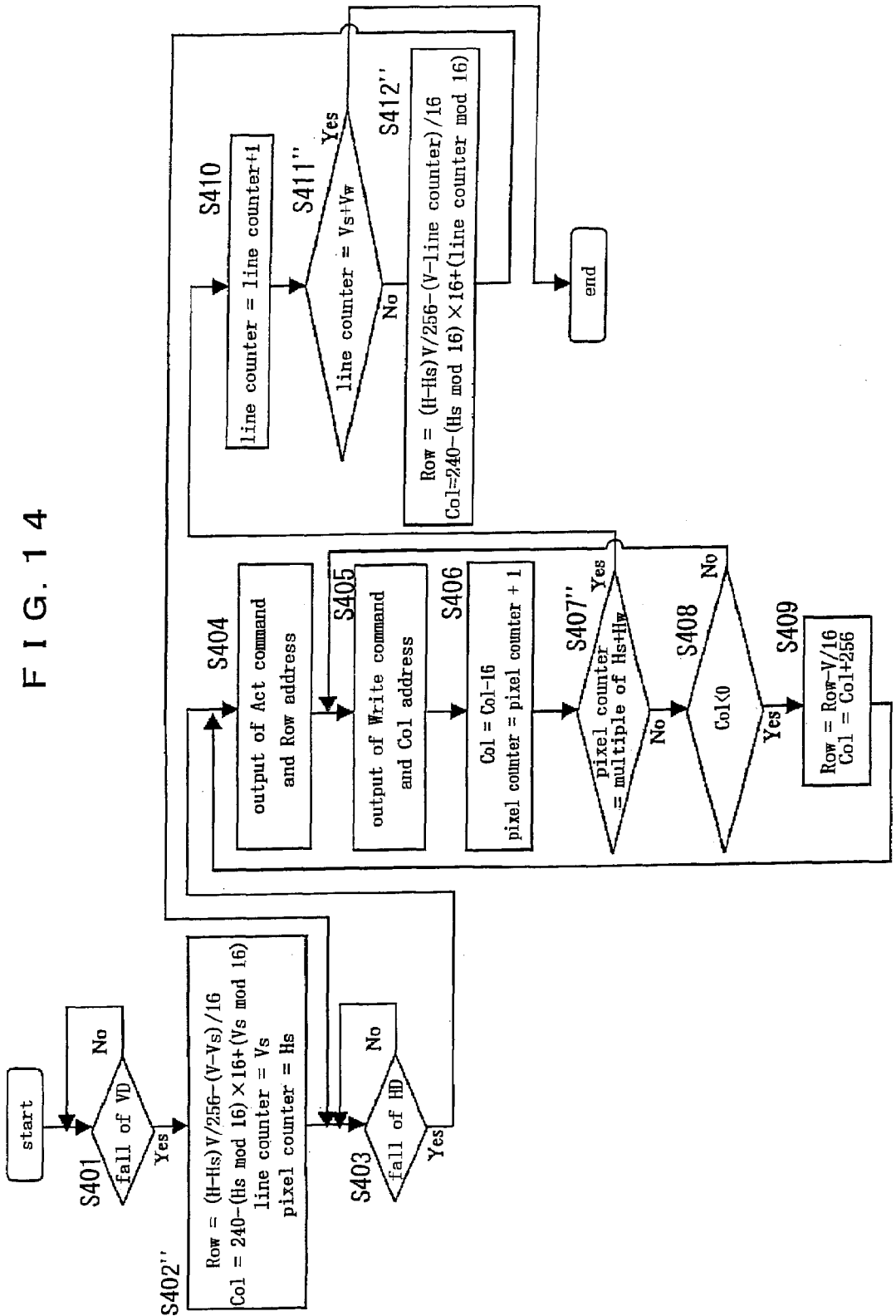
FIG. 14 is a flow chart illustrating a sixth example of image data writing with respect to SDRAM according to the preferred embodiment of the present invention.
Figure 15:
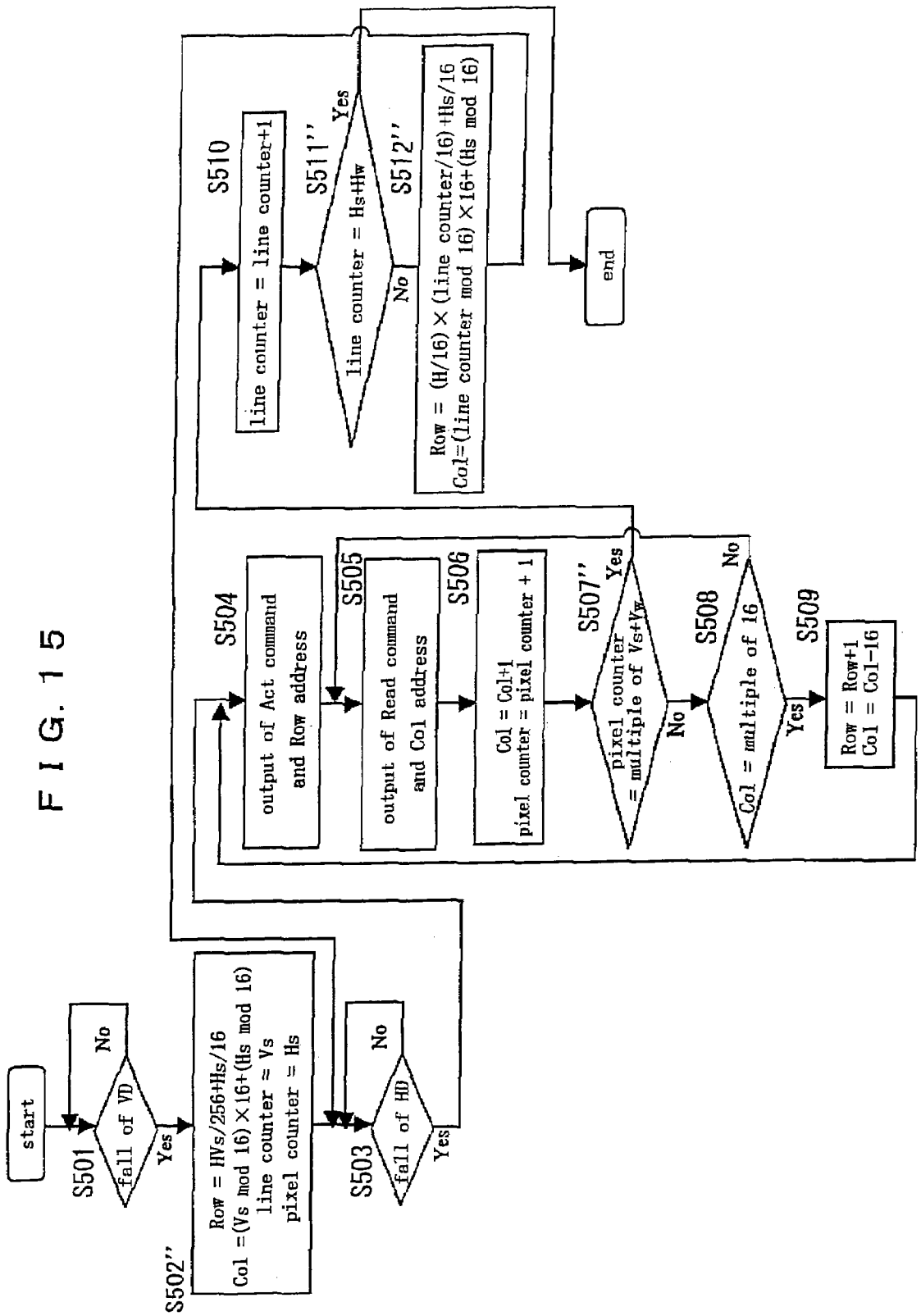
FIG. 15 is a flow chart illustrating a sixth example of image data reading with respect to SDRAM according to the preferred embodiment of the present invention.
Figure 16:
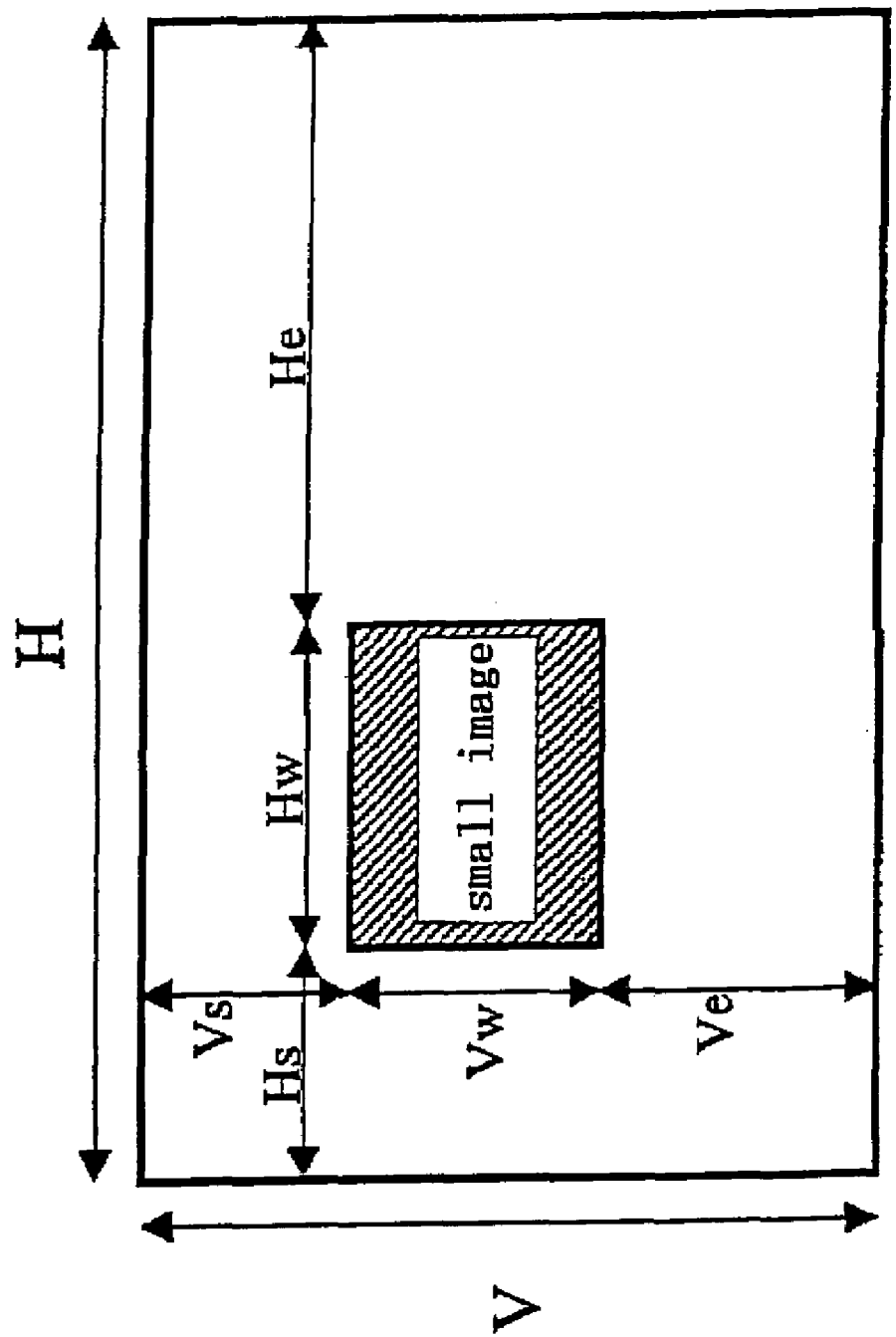
FIG. 16 is a chart illustrating the configuration wherein a small image data is provided in image data

Next is described the case, as shown in FIG. 16, in which small image data having less number of the pixels than the image data is provided in the image data having the number of the pixels being H×V, referring to the flow charts of FIGS. 12-15. The processing shown therein is basically same as in the flow charts of FIGS. 2-5. FIGS. 12, 13, 14, and 15 respectively correspond to FIGS. 2, 3, 4, and 5.

The small image data have a size of "Hw×Vw", the number of the pixels for one line Hw multiplied by "the number of the lines Vw.

Further, as shown in FIG. 16, the small image data is disposed in the image data as follows.

Between the small image data and the beginnings of the respective lines are provided intervals for the number of the image data Hs.

Between the small image data and the ends of the respective lines are provided the intervals for the number of the image data He Between the small image data and the first line "0" are provided the intervals of the number for the lines Vs.

Between the small image data and the last line "s" are provided the intervals of the number for the lines Ve.

Figure 12:
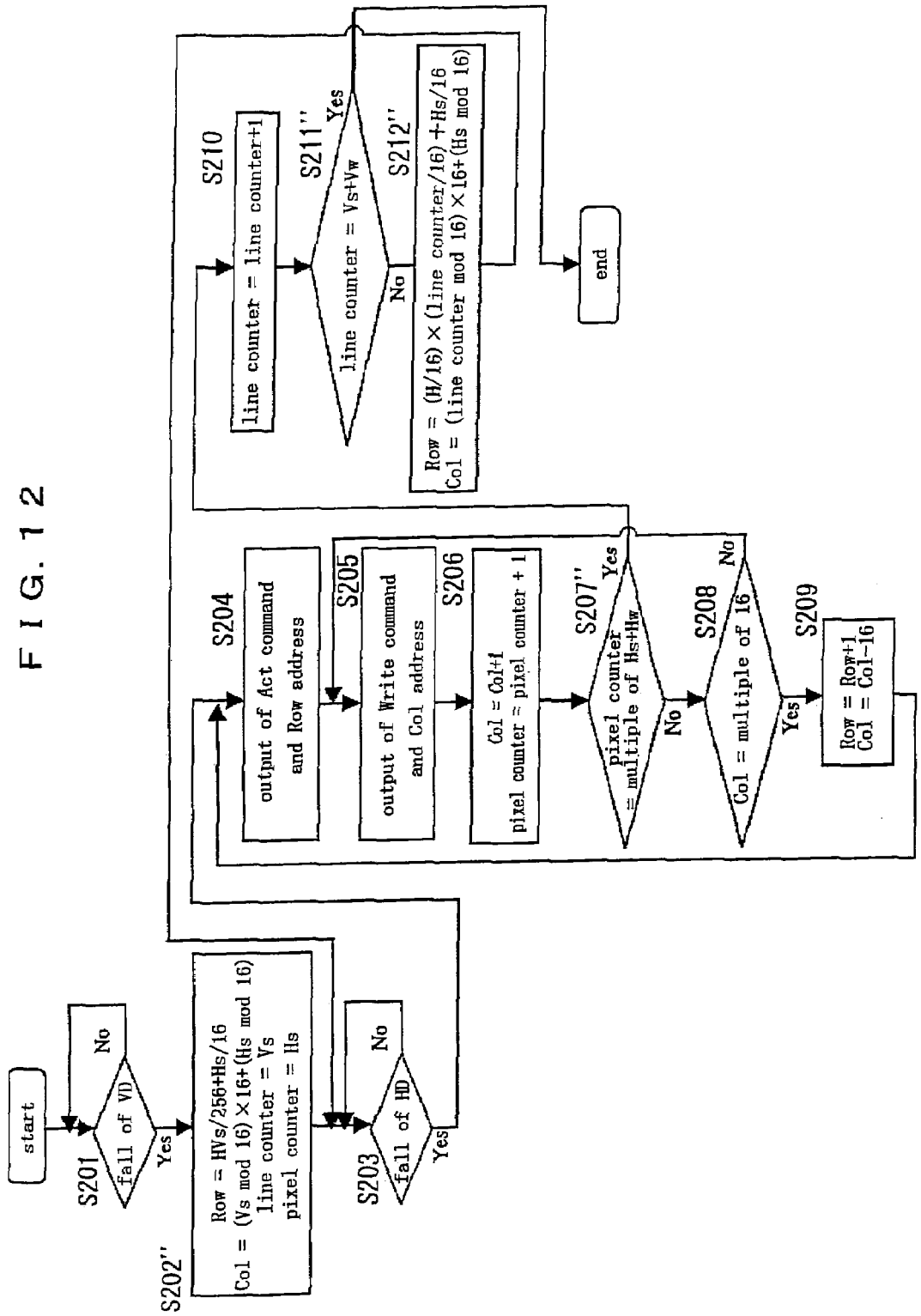
FIG. 12 is a flow chart illustrating a fifth example of image data writing with respect to SDRAM according to the preferred embodiment of the present invention.
Figure 13:
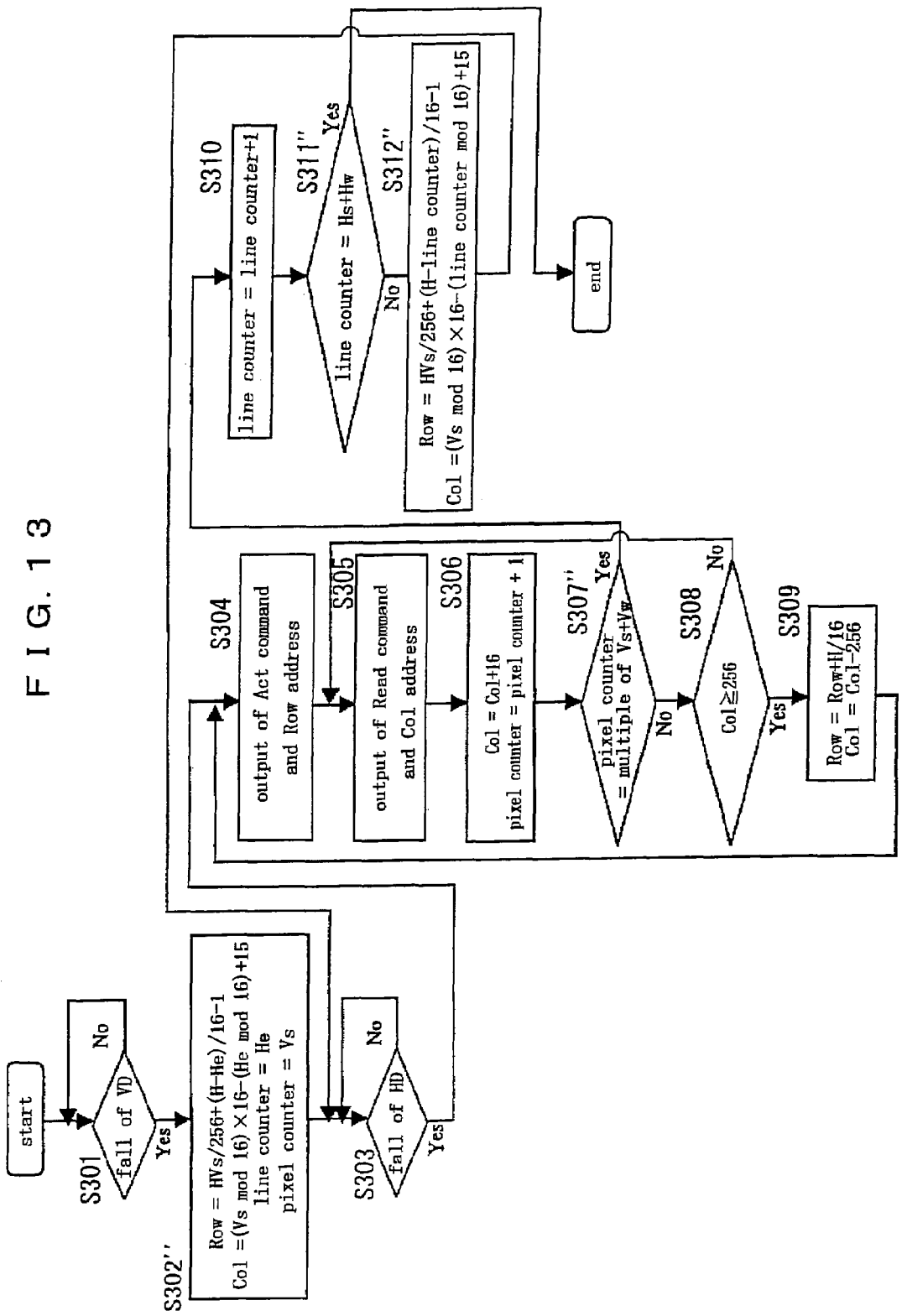
FIG. 13 is a flow chart illustrating a fifth example of image data reading with respect to SDRAM according to the preferred embodiment of the present invention.

First is described the case, wherein the rotation angle of the first image rotation processing implemented when the image data is written in the SDRAM 2 is 0° and the rotation angle of the second image rotation processing implemented when the image data is read from the SDRAM 2 is 90°, referring to the flow charts of FIGS. 12 and 13.

The writing processing of the image data with respect to the SDRAM 2 (including the first image rotation processing at the rotation angle of 0°) is first described referring to the flow chart of FIG. 12. This writing processing is basically same as in the flow chart of FIG. 2. Therefore, the processing steps in FIG. 12 identical to those in FIG. 2 have the same reference numerals shown therein and are not described here.

The flow chart of FIG. 12 is different to the flow chart of FIG. 2 in S202", S207", S211", and S212". The processing of the S202" designates the addresses of the write-in recording region immediately after the fall of the vertical synchronization period VD. The addresses are set in the processing of the S202 as follows:

the Row-address count number of the Write Row counter 7, which is the designated value of the Row address→0 the Column-address count number of the Write Column counter 8, which is the designated value of the Column address→0 the line count number of the Write line counter 3→0 the pixel count number of the Write pixel counter 4→0.

In contrast to that, in the processing of the S202", in response to separating the small image data from the image data and writing the small image data:

The Row-address count number of the Write Row counter 7 is set according to the following formula:

Write Row address=$HVs/256+Hs/16$

The Column-address count number of the Write Column counter 8 is set according to the following formula:

Write Column address=$(Vs_{mod}16) \times 16 + (Hs_{mod}16)$

The line count number of the Write line counter 3 is set at Vs.

The pixel count number of the Write pixel counter 4 is set at Hs.

The S202" is different from the S202 in that the write-in address position is initialized according to the foregoing formulas.

The S207 and S207" judge whether or not the writing processing of the pixel data for one line in the image data and small image data with respect to the SDRAM 2 is completed. In the processing of FIG. 2, in which the image data is written, the judgment is based on whether or not the pixel count number of the Write pixel counter 4 is equal to a multiple of the number of the pixels H for one line in the image data. In contrast to that, in the processing of FIG. 12, in which the small image data is separated from the image data and written in the SDRAM 2, the judgment is made based on whether or not the pixel count number of the Write pixel counter 4 is equal to a multiple of "Hs+Hw". The S207" is different from the S207 in implementing the foregoing processing.

The S211 and S211" judge whether or not the writing processing of all the pixel data in the image data and small image data with respect to the SDRAM 2 is completed. In the processing of FIG. 2, in which the image data is written, the judgment is made based on whether or not the line count number of the Write line counter 3 is equal to the total number of the lines V in the image data. In contrast to that, in the processing of FIG. 12, in which the small image data is separated from the image data and written in the SDRAM 2, the judgment is made based on whether or not the line count number of the Write line counter 3 is equal to "Vs+Vw". The S211" is different to the S211 in implementing the foregoing processing.

The S212 and S212" designate the next write-in recording region in the SDRAM 2 after the pixel data for one line in the image data and small image data is written in the SDRAM 2. In the processing of FIG. 2, in which the image data is written, the Row address of the next recording region to be designated in the S212 is designated according to the following formula:

$$\text{Write Row address} = H/16 \times \frac{\text{the count number of the Write line counter 3}}{16}$$

The Column address is designated according to the following formula:

Write Column address=the line count number of the Write line counter $3_{mod}16 \times 16$ In contrast to that, in the processing of FIG. 12, in response to separating the small image data from the image data and writing the small image data, the Row address of the next recording region to be designated in the S212" is designated according to the following formula:

$$\text{Write Row address} = H/16 \times \frac{\text{the count number of the Write line counter 3}}{16} + Hs/16$$

The Column address is designated according to the following formula:

Write Column address=the count number of the
Write line counter $3_{mod}16\times16+(Hs_{mod}16)$ The S212" is different from the S212 in implementing the foregoing processing.

Next is described the case, wherein the first image rotation processing (the rotation angle is 0° in the foregoing example meaning that the first image rotation processing is not substantially implemented) is first implemented when the image data is written in the SDRAM 2 and the second image rotation processing at the rotation angle of 90° is implemented when the image data is read from the SDRAM 2, referring to the flow chart of FIG. 13.

This writing processing is basically same as in the flow chart of FIG. 3.

Therefore, the processing steps in FIG. 13 identical to those in FIG. 3 have the same reference numerals shown therein and are not described here.

The flow charts of FIGS. 13 and 3 are different in S302", S307", S311", and S312".

The 302 and S302" designate the addresses of the read-out recording region immediately after the fall of the vertical synchronization period VD. In the processing of the S302, the Read Row address is designated according to the following formula:

Read Row address=$H/16-1$

The Read Column address is renewed as 15, and the line count number of the Read line counter 5 and the pixel count number of the Read pixel counter 6 are renewed as 0.

In contrast to that, in the processing of the S302, in response to separating the small image data from the image data and writing the small image data, the Read Row address is designated according to the following formula:

Read Row address=$HVs/256+(H-He)/16-1$

The Read Column address is designated according to the following formula:

Read Column address=$(Vs_{mod}16)\times16-(He_{mod}16)+15$

The line count number of the Read line counter 5 is renewed as He, and the pixel count number of the Read pixel counter 6 is renewed as Vs.

The S302" is different to the S302 in implementing the foregoing processing.

The S307 and S307" judge whether or not the pixel data for one line in the image data and small image data after the implementation of the second image rotation processing thereto is read from the SDRAM 2. In the processing of FIG. 3, in which the image data is read, the judgment is made based upon whether or not the pixel count number of the Read pixel counter 6 is equal to a multiple of the number of the lines V in the initial image data. In contrast to that, in the processing of FIG. 13, in which the small image data is separated from the image data and written in the SDRAM 2, judgment is made based upon whether or not pixel count number of the Write pixel counter 4 is equal to a multiple of "Vs+Vw". The S307" is different to the 307 in implementing the foregoing processing.

The S311 and S311" judge whether or not the reading processing of all the pixel data in the image data and small image data with respect to the SDRAM 2 is completed. In the processing of FIG. 3, in which the image data is read, judgment is based on whether or not the line count number of the Read line counter 5 is equal to the number of the pixels H for one line in the image data. In contrast to that, in the processing of FIG. 13, in which the small image data is separated from the image data and written in the SDRAM 2, the judgment is made based on whether or not the line count number of the Write line counter 3 is equal to "He+Hw". The S311" is different to the S311 in implementing the foregoing processing.

The S312 and S312" designate the next read-out recording region after the pixel data for one line in the reading-processed image data is read from the SDRAM 2. In the processing of FIG. 3, in which the image data is read, the Row-address count number of the Read Row counter 9, which is the Row address of the next recording region to be designated in the S312 is renewed according to the following formula:

$$\text{Read Row address} = H/16 - 1 - \frac{\text{the count number of the Read line counter 5}}{16}$$

The Column-address count number of the Read Column counter 10 is renewed according to the following formula:

Read Column address=15-the count number of the
Read line counter $5_{mod}16$

In contrast to that, in the processing of FIG. 13, in response to separating the small image data from the image data to write and thereafter read the small image data with respect to the SDRAM 2, the Row-address count number of the Read Row counter 9 in the S312" is renewed according to the following formula:

$$\text{Read Row address} = HVs/256 + \frac{H - \text{the count number of the Read line counter 5}}{16} - 1$$

The Column-address count number of the Read Column counter 10 is renewed according to the following formula:

Read Column address=$(Vs_{mod}16)\times16$-the count number of the Read line counter $5_{mod}16+15$ The S312" is different from the S312 in implementing the foregoing processing.

Next is described the case, wherein the rotation angle of the first image rotation processing implemented when the image data is written in the SDRAM 2 is 90° and the rotation angle of the second image rotation processing implemented when the image data is read from the SDRAM 2 is 0°, referring to the flow charts of FIGS. 14 and 15.

The writing processing of the image data with respect to the SDRAM 2 (including the first image rotation processing at the rotation angle of 90°) is first described referring to the flow chart of FIG. 14. This writing processing is basically same as in the flow chart of FIG. 4. Therefore, the processing steps in FIG. 14 identical to those in FIG. 4 have the same reference numerals shown therein and are not described here.

The flow chart of FIG. 14 is different to the flow chart of FIG. 4 in S402", S407", S411", and S412".

The S402 and S402" designate the addresses of the write-in recording region immediately after the fall of the vertical synchronization period VD. The Row-address count number of the Write Row counter 7, which is the Row address in the S402 is renewed according to the following formula:

Write Row address=$HV/256-V/16$

The Column-address count number of the Write Column counter 8 is renewed as 240. The line count number of the Write line counter 3 and the pixel count number of the Write pixel counter 4 are renewed as 0.

In contrast to that, in the processing of the S402″, in response to separating the small image data from the image data and writing the small image data, the Row-address count number of the Write Row counter 7 is renewed according to the following formula:

Write Row address=$(H-Hs)V/256-(V-Vs)/16$

The Column-address count number of the Write Column counter 8 is renewed according to the following formula:

Write Column address=$240-(Hs_{mod}16)\times16+(Vs_{mod}16)$

The line count number of the Write line counter 3 is renewed as Vs, and the pixel count number of the Write pixel counter 4 is renewed as Hs. The S402″ is different from the S402 in implementing the foregoing processing.

The S407 and S407″ judge whether or not the writing of the pixel data for one line in the image data and small image data after the implementation of the first image rotation processing thereto with respect to the SDRAM 2 is completed. In the processing of FIG. 4, in which the image data is written, the judgment is made based on whether or not the pixel count number of the Write pixel counter 4 is equal to a multiple of the number of the pixels H for one line in the initial image data. In contrast to that, in the processing of FIG. 14, in which the small image data is separated from the image data and written in the SDRAM 2, the judgment is made based on whether or not the pixel count number of the Write pixel counter 4 is equal to a multiple of "Hs+Hw". The S402″ is different to the S402 in implementing the foregoing processing.

The S411 and S411″ judge whether or not the writing processing of all the pixel data in the image data or small image data with respect to the SDRAM 2 is completed. In the processing of FIG. 4, in which the image data is written, the judgment is based on whether or not the line count number of the Write line counter 3 is equal to the number of the lines V in the image data. In contrast to that, in the processing of FIG. 14, in which the small image data is separated from the image data and written in the SDRAM 2, judgment is based on whether or not the line count number of the Write line counter 3 is equal to "Vs+Vw". The S411″ is different to the S411 in implementing the foregoing processing.

The S412 and S412″ designate the next write-in recording region after the pixel data for one line in the image data and small image data is written in the SDRAM 2. In the processing of FIG. 4, in which the image data is written, the Row-address count number of the Write Row counter 7, which is the Row address of the next write-in recording region in the S412 is renewed according to the following formula:

$$\text{Write Row address} = HV/256 - \frac{V - \text{the count number of the Write line counter 3}}{16}$$

The Column-address count number of the Write Column counter 8 is renewed according to the following formula:

Write Column address=$240+$the count number of the Write line counter $3_{mod}16$ In contrast to that, in the processing of FIG. 14, in response to separating the small image data from the image data and writing the small image data in the SDRAM 2, the Row-address count number of the Write Row counter 7 in the S412″ is renewed according to the following formula:

$$\text{Write Row address} = (H - HS)V/256 - \frac{V - \text{the count number of the Write line counter 3}}{16}$$

The Column-address count number of the Write Column counter 8 is renewed according to the following formula:

Write Column address=$240-(Hs_{mod}16)\times16+$the count number of the Write line counter $3_{mod}16$ The S412″ is different to the S412 in implementing the foregoing processing.

Next is described the case, in which the first image rotation processing (in the foregoing example, at the rotation angle of 90°) is first implemented when the image data is written in the SDRAM 2 and then the second image rotation processing at the rotation angle of 0° is implemented when the image data is read from the SDRAM 2, referring to the flow chart of FIG. 15. This reading processing is basically same as in the flow chart of FIG. 5. Therefore, the processing steps in FIG. 15 identical to those in FIG. 5 have the same reference numerals shown therein and are not described here.

The flow chart of FIG. 15 and the flow chart of FIG. 5 are different in S502″, S507″, S511″, and S512″.

The S502 and S502″ designate the addresses of the read-out recording region immediately after the fall of the vertical synchronization period VD. In the processing of the S502, the Row-address count number of the Read Row counter 9, which is the Row address, the Column-address count number of the Read Column counter 10, the line count number of the Read line counter 5, and the pixel count number of the Read pixel counter 6 are renewed as 0.

In contrast to that, in the processing of the S502″, in response to separating the small image data from the image data and writing the small image data in the SDRAM 2, the Row-address count number of the Read Row counter 9 is renewed according to the following formula:

Read Row address=$HVs/256+Hs/16$

The Column-address count number of the Read Column counter 10 is renewed according to the following formula:

Read Column address=$(Vs_{mod}16)\times16+(Hs_{mod}16)$

The line count number of the Read line counter 5 is renewed as Vs, and the pixel count number of the Read pixel counter 6 is renewed as Hs.

The S502″ is different to the S502 in implementing the foregoing processing.

The S507 and S507″ judge whether or not the reading of the pixel data for one line in the image data and small image data after the implementation of the first image rotation processing thereto with respect to the SDRAM 2 is completed. In the processing of FIG. 5, in which the image data read, judgment is based on whether or not the pixel count number of the Read pixel counter 6 is equal to a multiple of the number of the lines V in the initial image data. In contrast to that, in the processing of FIG. 15, in which the small image data is separated from the image data and written in the SDRAM 2, the judgment is made based on whether or not the pixel count number of the Read pixel counter 6 is equal to a multiple of "Vs+Vw". The S507" is different to the S507 in implementing the foregoing processing.

The S511 and S511" judge whether or not the reading processing of the all the pixel data in the image data and small image data with respect to the SDRAM 2 is completed. In the processing of FIG. 5, in which the image data is read, the judgment is made based on whether or not the line count number of the Read line counter 5 is equal to the number of the pixels H for one line in the initial image data. In contrast to that, in which the small image data is separated from the image data to be written and thereafter read with respect to the SDRAM 2, the judgment is made based on whether or not the line count number of the Read line counter 5 is equal to "Hs+Hw". The S511" is different from the S511 in implementing the foregoing processing.

The S512 and S512" designate the next read-out recording region after the pixel data for one line in the image data and small image data is read from the SDRAM 2. In the processing of FIG. 5, wherein the image data is read, the Row-address count number of the Read Row counter 9, which is the Row address of the next read-out recording region to be designated in the S512, is renewed according to the following formula:

$$\text{Read Row address} = H/16 \times \frac{\text{the count number of the Read line counter 5}}{16}$$

The Column-address count number of the Read Column counter 10 is renewed according to the following formula:

Read Column address=the count number of the read line counter $5_{mod}16 \times 16$ In contrast to that, in the processing of FIG. 15, in response to separating the small image data from the image data and writing the small image data in the SDRAM 2, the Row-address count number of the Read Row counter 9 in the S512" is renewed according to the following formula:

$$\text{Read Row address} = H/16 \times \frac{\text{the count number of the Read line counter 5}}{16} + Hs/16$$

The Column-address count number of the Read Column counter 10 is renewed according to the following formula:

Read Column address=the count number of the Read line counter $5_{mod}16 \times 16 + (HS_{mod}16)$ The S512" is different from the S512 in implementing the foregoing processing.

The followings are settings of the horizontal synchronization period HD and vertical synchronization period VD in implementing the foregoing image rotation processing when the image data shown in FIG. 19A (the number of the pixels for one line: H, the number of the lines: V) is written and read with respect to the SDRAM 2.

When the image data after the implementation of the second image rotation processing thereto is converted from the initial image data into the image rotated at the angle of 90° (the number of the pixels for one line: V, the number of the lines: H), as shown in FIG. 19B, time period set for writing and reading the pixels for one line h is extended longer than the time period set for reading the pixels for one line in the actual number of the pixels V. As a result, additional writing and reading time is consumed resulting in a failure to implement the writing and reading with respect to all the lines in terms of time.

In order to eliminate the inconvenience, in this embodiment, when the rotation angle of the first image rotation processing is 90°×r (r=1 and 3), the horizontal synchronization period HD1 used when the image data is written in the SDRAM 2 is set according to the following formula 1.

$$HD1=VD/HD2 \qquad 1$$

VD: vertical synchronization period used when the image data is written and read with respect to the SDRAM 2

HD2: horizontal synchronization period used when the initial image data prior to the implementation of the first image rotation processing thereto is written in the SDRAM 2 in the initial image direction.

When the rotation angle of the second image rotation processing is 90°×r (r=1 and 3), the horizontal synchronization period HD3 used when the image data is read from the SDRAM 2 is set according to the following formula 2.

$$HD3=VD/HD4 \qquad 2$$

VD: vertical synchronization period used when the image data is written and read with respect to the SDRAM 2

HD4: horizontal synchronization period used when the initial image data prior to the implementation of the second image rotation processing thereto is read from the SDRAM 2 in the initial image direction.

Thus, as shown in FIG. 19C, time period h' set for writing and reading the pixels for one line is equivalent to the time period required for writing and reading the pixels for one line in the actual number of the pixels V, and the additional writing/reading time for each line becomes unnecessary. In consequence of that, all the pixels constituting the image data can be unfailingly written and read within the time period of the vertical synchronization period VD used when the image data is written and read with respect to the SDRAM 2. In order to exercise the foregoing control, the image processing apparatus 1 can be additionally provided with a device for adjusting the horizontal synchronization period HD or supplied with the horizontal synchronization period HD previously adjusted in the foregoing manner from outside.

The described embodiment focused on implementing the image rotation processing to the image data written and read with respect to the SDRAM 2. This invention still feasible in further implementing an image anti-rotation processing to the image data written and read with respect to the SDRAM 2. In that case, the order of reading the Column addresses described earlier should be simply reversed. According to the described embodiment, the rotation angles of the first and second image rotation processing are set at 90°, however needless to say, the present invention is feasible with the rotation angle thereof set at 270°. Further, the present invention is, of course, feasible when the first and second image rotation processing include an image rotation at the rotation angle of 180°.

In the foregoing embodiment, the present invention was described in using the image processing apparatus, which carries out the progressive scan, and still feasible in using an image processing apparatus, which carries out the interlace scan. In that case, the pixel data should be written in the addresses corresponding to even numbers of the lines in a first field and in the addresses corresponding to odd numbers of the lines in a second field.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An image processing method, wherein
image data having a total number of pixels being H×V (H: the number of the pixels for one line, V: a total number of lines, H and V: integer) is written in SDRAM having an enough number of recording domains capable of storing all the pixel data of the image data and the number of Column addresses set therein at $2^n$ ($4 \leq n$, n: integer) in the order of the lines after the implementation of a first image rotation processing at a rotation angle of $90° \times m$ ($0 \leq m \leq 3$, m: integer) to the image data, and
the written image data is read from the SDRAM in the order of the lines after the implementation of a second image rotation processing at a rotation angle of $90° \times p$ ($0 \leq p \leq 3$, p: integer) to the image data,
in the image processing method,
the recording domains of the SDRAM are divided into a plurality of recording blocks having the number of the Column addresses set therein at $2^q$ ($2 \leq q \leq (n-2)$, q: integer) and an enough number of recording regions capable of storing groups of the pixels for one line in the image data in an image direction after the implementation of the first image rotation processing,
the respective groups of the pixels for one line in the image data in the image direction after the implementation of the first image rotation processing are arranged to sequentially correspond to the respective recording blocks in the order of the lines,
the respective groups of the pixels for one line in the image data in the image direction after the implementation of the first image rotation processing are written in the corresponding recording blocks based on an addressing for incrementing Row addresses per the number of the Column addresses of the recording blocks, and
the image data written in the SDRAM is read from the SDRAM in the order of the lines in an image direction after the implementation of the second image rotation processing.

2. An image processing method as claimed in claim 1, wherein
when the rotation angle of the second image rotation processing is $90° \times r$ (r=1 and 3), a horizontal synchronization period HD3 used in reading the image data from the SDRAM is set according to the following formula 1, $$HD1 = VD/HD2 \qquad 1,$$

VD: vertical synchronization period used in writing/reading the image data with respect to the SDRAM
HD2: horizontal synchronization period used in reading the image data prior to the implementation of the second image rotation processing from the SDRAM in the image direction of the image data.

3. The image processing method as claimed in claim 1, wherein the rotation angle of the image data after the implementation of the second image rotation processing is $90° \times r$ (r=1 and 3) with respect to the image data prior to the implementation of the first image rotation processing, a horizontal synchronization period HD used in reading the image data from the SDRAM is set to a period equal to a time required for reading one line of pixels in the image data after the implementation of the second image rotation processing.

4. An image processing method, wherein
image data having a total number of pixels being H×V (H: the number of the pixels for one line, V: a total number of lines, H and V: integer) is written in SDRAM having an enough number of recording domains capable of storing all the pixel data of the image data and the number of Column addresses set therein at $2^n$ ($4 \leq n$, n: integer) in the order of the lines in an image direction of the image data, and
the written image data is read from the SDRAM in the order of the lines after the implementation of an image rotation processing at a rotation angle of $90° \times p$ ($0 \leq p \leq 3$, p: integer) to the image data,
in the image processing method,
the recording domains of the SDRAM are divided into a plurality of recording blocks having the number of the Column addresses set therein at $2^q$ ($2 \leq q \leq (n-2)$, q: integer) and an enough number of recording regions capable of storing groups of the pixels for one line in the image data in an image direction prior to the implementation of the image rotation processing,
the respective groups of the pixels for one line in the image data in the image direction prior to the implementation of the image rotation processing are arranged to sequentially correspond to the respective recording blocks in the order of the lines in the image direction,
the respective groups of the pixels for one line in the image data in the image direction prior to the implementation of the image rotation processing are written in the corresponding recording blocks based on an addressing for incrementing Row addresses per the number of the Column addresses of the recording blocks, and
the image data written in the SDRAM is read from the SDRAM in the order of the lines in an image direction after the implementation of the image rotation processing.

5. An image processing method as claimed in claim 4, wherein
when the rotation angle of the image rotation processing is $90° \times r$ (r=1 and 3), a horizontal synchronization period HD1 used in reading the image data from the SDRAM is set according to the following formula 1

$$HD1 = VD/HD2 \qquad 1$$

VD: vertical synchronization period used in writing/reading the image data with respect to the SDRAM
HD2: horizontal synchronization period used in writing the image data in the SDRAM.

6. The image processing method as claimed in claim 4, wherein when the rotation angle of the image rotation processing is $90° \times r$ (r=1 and 3), a horizontal synchronization period HD used in reading the image data from the SDRAM is set to a period equal to a time required for reading one line of pixels in the image data after the implementation of the image rotation processing.

7. An image processing method, wherein
image data having a total number of pixels being H×V (H: the number of the pixels for one line, V: a total number of lines, H and V: integer) is written in SDRAM having an enough number of recording domains capable of storing all the pixel data of the image data and the number of Column addresses set therein at $2^n$ ($4 \leq n$, n: integer) in the order of the lines after the implementation of an image rotation processing at a rotation angle of $90° \times m$ ($0 \leq m \leq 3$, m: integer) to the image data, the written image data is read from the SDRAM in the order of the lines in an image direction after the implementation of the image rotation processing, the recording domains of the SDRAM are divided into a plurality of recording blocks having the number of the Column addresses set therein at $2^q$ ($2 \leq q \leq (n-2)$, q: integer) and an enough number of recording regions capable of storing groups of the pixels for one line in the image data in an image direction after the implementation of the image rotation processing, the respective groups of the pixels for one line in the image data in the image direction after the implementation of the image rotation processing are arranged to sequentially correspond to the respective recording blocks in the order of the lines in the image direction, the respective groups of the pixels for one line in the image data in the image direction after the implementation of the image rotation processing are written in the corresponding recording blocks based on an addressing for incrementing Row addresses per the number of the Column addresses of the recording blocks, and the image data written in the SDRAM is read from the SDRAM in the order of the lines in the image direction after the implementation of the image rotation processing.

8. An image processing apparatus comprising,

SDRAM having an enough number of recording domains capable of storing all pixels in image data having a total number of pixels being H×V (H: the number of the pixels for one line, V: a total number of lines, H and V: integer) and the number of Column addresses set therein at $2^n$ ($4 \leq n$, n: integer), wherein the image data is written in the SDRAM in the order of the lines after the implementation of a first image rotation processing at a rotation angle of $90° \times m$ ($0 \leq m \leq 3$, m: integer) to the image data, and the written image data is read from the SDRAM in the order of the lines after the implementation of a second image rotation processing at a rotation angle of $90° \times p$ ($0 \leq p \leq 3$, p: integer) further to the image data, the image processing apparatus further comprising:

means for dividing the recording domains of the SDRAM into a plurality of recording blocks having the number of the Column addresses set therein at $2^q$ ($2 \leq q \leq (n-2)$, q: integer) and an enough number of recording regions capable of storing groups of the pixels for one line in the image data in an image direction after the implementation of the first image rotation processing, arranging the respective groups of the pixels for one line in the image data in the image direction after the implementation of the first image rotation processing to the image data so as to sequentially correspond to the respective recording blocks in the order of the lines, and writing the respective groups of the pixels for one line in the image data in the image direction after the implementation of the first image rotation processing in the corresponding recording blocks based on an addressing for incrementing Row addresses per the number of the Column addresses of the recording blocks, and means for reading the image data written in the SDRAM from the SDRAM in the order of the lines in an image direction after the implementation of the second image rotation processing.

9. An image processing apparatus as claimed in claim 8, wherein when the rotation angle of the second image rotation processing is $90° \times r$ (r=1 and 3), a horizontal synchronization period HD1 used in reading the image data from the SDRAM is set according to the following formula 1, $$HD1 = VD/HD2 \qquad 1,$$

VD: vertical synchronization period used in writing/reading the image data with respect to the SDRAM HD2: horizontal synchronization period used in reading the image data from the SDRAM in the image direction of the image data prior to the implementation of the second image rotation processing.

10. The image processing apparatus as claimed in claim 8, wherein when the rotation angle of the image data after the implementation of the second image rotation processing is $90° \times r$ (r=1 and 3) with respect to the image data prior to the implementation of the first image rotation processing, a horizontal synchronization period HD used in reading the image data from the SDRAM is set to a period equal to a time required for reading one line of pixels in the image data after the implementation of the second image rotation processing.

11. An image processing apparatus comprising,

SDRAM having an enough number of recording domains capable of storing all pixels in image data having a total number of pixels being H×V (H: the number of the pixels for one line, V: a total number of lines, H and V: integer) and the number of Column addresses set therein at $2^n$ ($4 \leq n$, n: integer), wherein the image data is written in the SDRAM in the order of the lines in the image direction of the image data, and the written image data is read from the SDRAM in the order of the lines after the implementation of an image rotation processing at a rotation angle of $90° \times p$ ($0 \leq p \leq 3$, p: integer) to the image data, the image processing apparatus further comprising:

means for dividing the recording domains of the SDRAM into a plurality of recording blocks having the number of the Column addresses set therein at $2^q$ ($2 \leq q \leq (n-2)$, q: integer) and an enough number of recording regions capable of storing groups of the pixels for one line in the image data in an image direction prior to the implementation of the image rotation processing, arranging the respective groups of the pixels for one line in the image data in the image direction prior to the implementation of the image rotation processing to the image data so as to sequentially correspond to the respective recording blocks in the order of the lines in the image direction, and writing the respective groups of the pixels for one line in the image data in the image direction prior to the implementation of the image rotation processing in the corresponding recording blocks based on an addressing for incrementing Row addresses per the number of the Column addresses of the recording blocks, and means for reading the image data written in the SDRAM from the SDRAM in the order of the lines in an image direction after the implementation of the image rotation processing.

12. An image processing apparatus as claimed in claim 11, wherein
when the rotation angle of the image rotation processing is 90°×r (r=1 and 3), a horizontal synchronization period HD1 used in reading the image data from the SDRAM is set according to the following formula 1

$$HD1 = VD/HD2 \qquad 1$$

VD: vertical synchronization period used in writing/reading the image data with respect to the SDRAM
HD2: horizontal synchronization period used in writing the image data in the SDRAM.

13. The image processing apparatus as claimed in claim 11, wherein when the rotation angle of the image rotation processing is 90°×r (r=1 and 3), a horizontal synchronization period HD used in reading the image data from the SDRAM is set to a period equal to a time required for reading one line of pixels in the image data after the implementation of the image rotation processing.

14. An image processing apparatus comprising,
SDRAM having an enough number of recording domains capable of storing all pixels in image data having a total number of pixels being H×V (H: the number of the pixels for one line, V: a total number of lines, H and V: integer) and the number of Column addresses set therein at $2^n$ ($4 \leq n$, n: integer), wherein
the image data is written in the SDRAM having in the order of the lines after the implementation of an image rotation processing at a rotation angle of 90°×m ($0 \leq m \leq 3$, m: integer),
the written image data is read from the SDRAM in the order of the lines in an image direction after the implementation of the image rotation processing,
the image processing apparatus further comprising:
means for dividing the recording domains of the SDRAM into a plurality of recording blocks having the number of the Column addresses set therein at $2^q$ ($2 \leq q \leq (n-2)$, q: integer) and an enough number of recording regions capable of storing groups of the pixels for one line in the image data in the image direction after the implementation of the image rotation processing,
arranging the respective groups of the pixels for one line in the image data in the image direction after the implementation of the image rotation processing to the image data so as to sequentially correspond to the respective recording blocks in the order of the lines in the image direction, and
writing the respective groups of the pixels for one line in the image data in the image direction after the implementation of the image rotation processing in the corresponding recording blocks based on an addressing for incrementing Row addresses per the number of the Column addresses of the recording blocks, and
means for reading the image data written in the SDRAM from the SDRAM in the order of the lines in the image direction after the implementation of the image rotation processing.

15. An image processing method, comprising the steps of:
writing image data in SDRAM having 2n column addresses in a predetermined address order; and
reading the written image data in an address order different from the predetermined address order and rotating the image data, wherein the writing step is performed such that the common address change by 2q ($2 \leq q \leq n-2$) relative to a plurality of recording regions specified by a common row address;
wherein the reading step is performed based on a row address each time the image data is read from 2q consecutive recording regions specified by the common row address and 2q column address.

16. An image processing method, comprising the steps of:
writing image data in SDRAM having 2n column address in a predetermined address order; and
reading the written image data in an address order different from the predetermined address order and rotating the image data, wherein the writing step is performed such that a row address changes each time the image data is written in 2q ($2 \leq q \leq n-2$) consecutive recording regions specified by a common row address and 2q column address; and
the reading step is performed such that the column address change by 2q relative to a plurality of recording regions specified by the common row address.

* * * * *